(12) United States Patent
Shiozawa

(10) Patent No.: US 9,436,554 B2
(45) Date of Patent: Sep. 6, 2016

(54) INFORMATION PROCESSING APPARATUS AND DATA REPAIRING METHOD

(71) Applicant: FUJITSU LIMITED, Kawasaki-shi, Kanagawa (JP)

(72) Inventor: Kensuke Shiozawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 14/338,646

(22) Filed: Jul. 23, 2014

(65) Prior Publication Data

US 2015/0067442 A1  Mar. 5, 2015

(30) Foreign Application Priority Data

Aug. 30, 2013  (JP) .................................. 2013-180146

(51) Int. Cl.
*G06F 11/14* (2006.01)
*G06F 11/07* (2006.01)

(52) U.S. Cl.
CPC ....... *G06F 11/1435* (2013.01); *G06F 11/0787* (2013.01)

(58) Field of Classification Search
CPC ........... G06F 11/1435; G06F 11/0787; G06F 11/0703
USPC ....................................................... 714/764
See application file for complete search history.

(56) References Cited

U.S. PATENT DOCUMENTS

| | | | | |
|---|---|---|---|---|
| 6,199,187 B1* | 3/2001 | Tamura | ............... | G06F 11/1008 714/28 |
| 2005/0204212 A1* | 9/2005 | Noguchi | ............. | G06F 11/1048 714/710 |
| 2008/0162585 A1 | 7/2008 | Takahashi | | |
| 2008/0263412 A1* | 10/2008 | Keays | ....................... | G11C 8/06 714/48 |
| 2009/0106583 A1* | 4/2009 | Kawamura | ......... | G06F 11/1076 714/6.13 |
| 2012/0030441 A1* | 2/2012 | Yamashita | ............ | G06F 11/141 711/162 |
| 2013/0080854 A1* | 3/2013 | Nicholas | ............. | G06F 11/1016 714/758 |

FOREIGN PATENT DOCUMENTS

| | | |
|---|---|---|
| JP | 09-006653 A | 1/1997 |
| JP | 2005-250819 A | 9/2005 |
| JP | 2008-165474 A | 7/2008 |

OTHER PUBLICATIONS

Error Correction Codes With Address Checking IP.com Disclosure No. IPCOM000035242D Original Publication Date: Jun. 1, 1989 Included in the Prior Art Database: Jan. 28, 2005.*

(Continued)

*Primary Examiner* — Cynthia Britt
(74) *Attorney, Agent, or Firm* — Fujitsu Patent Center

(57) ABSTRACT

A processor executes a procedure including performing a repair process including first detecting whether there is any abnormality in data read out from a first storage, repairing abnormal data that is the data in which abnormality is detected as a result of the first detection, and storing the repaired data in a second storage area, second detecting when an address of data changed in the repair process and an address of a read-out source of the abnormal data in the first storage area match, whether there is any abnormality in data read out from an area indicated by the address of data changed in the repair process and the address of the read-out source of the abnormal data in the first storage area, repairing and storing, in the second storage area, the data in which abnormality is found as a result of the second detection.

6 Claims, 14 Drawing Sheets

(56) References Cited

OTHER PUBLICATIONS

Val Henson, Arjan van de Ven, Amit Gud, Zach Brown; "Chunkfs: Using Divide-and-Conquer to Improve File System Reliability and Repair"; HOTDEP'06 Proceedings of the 2nd Conference on Hot Topics in System Dependability—vol. 2, pp. 7-7, 2006.

Stephen C. Tweedie; "Journaling the Linux ext2fs Filesystem"; Proceedings of the 4th Annual LinuxExpo, Durham, NC,1998.

* cited by examiner

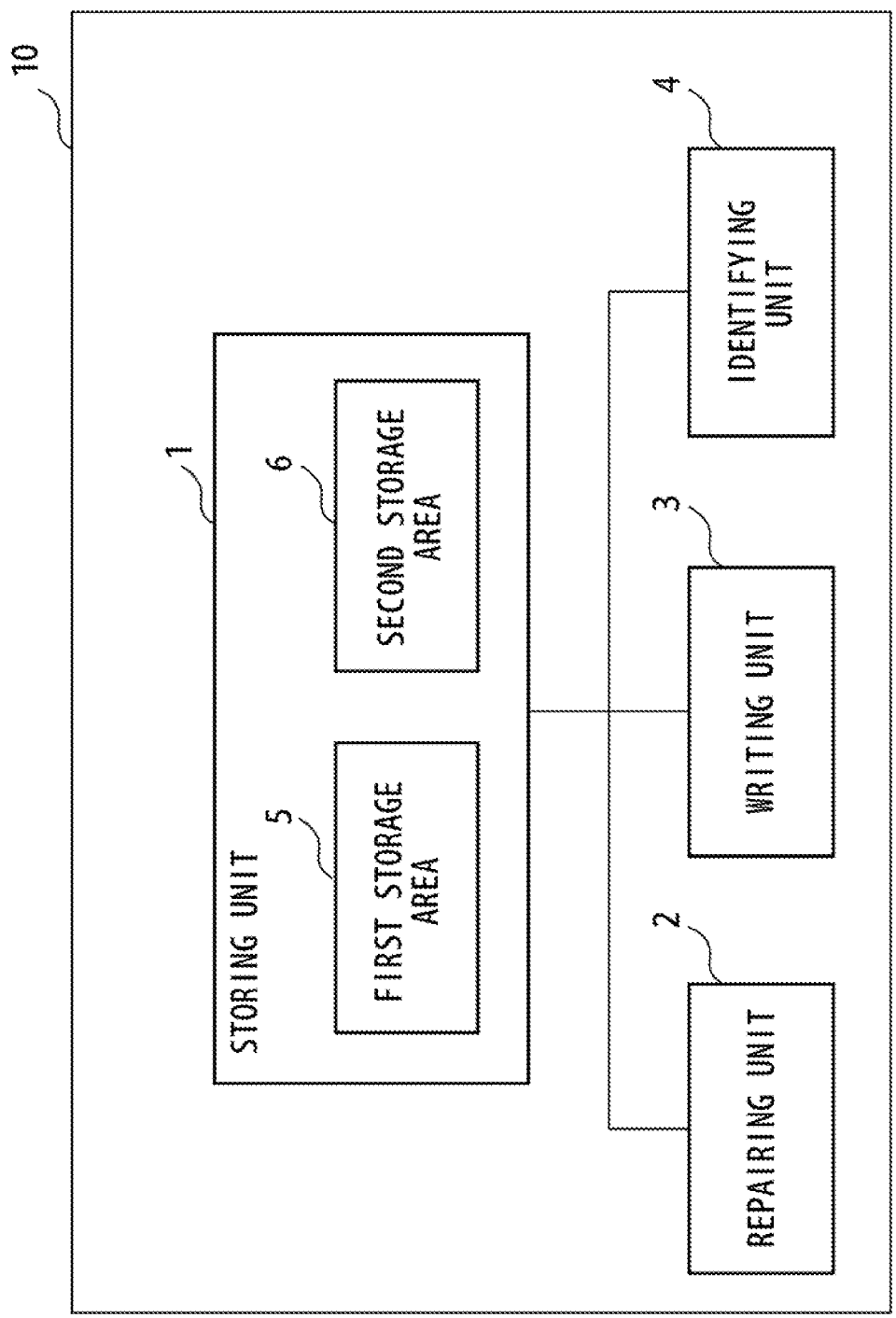

41

VARIABLE LENGTH ARRAY OF 64-BIT INTEGERS

0TH        01101100001      ....
FIRST      00010011000      ....
              ⋮
N TH       1001100110       ....
(N+1) TH   01001011100      ....
           11011000001      ....
              ⋮
              ⋮

F I G. 3

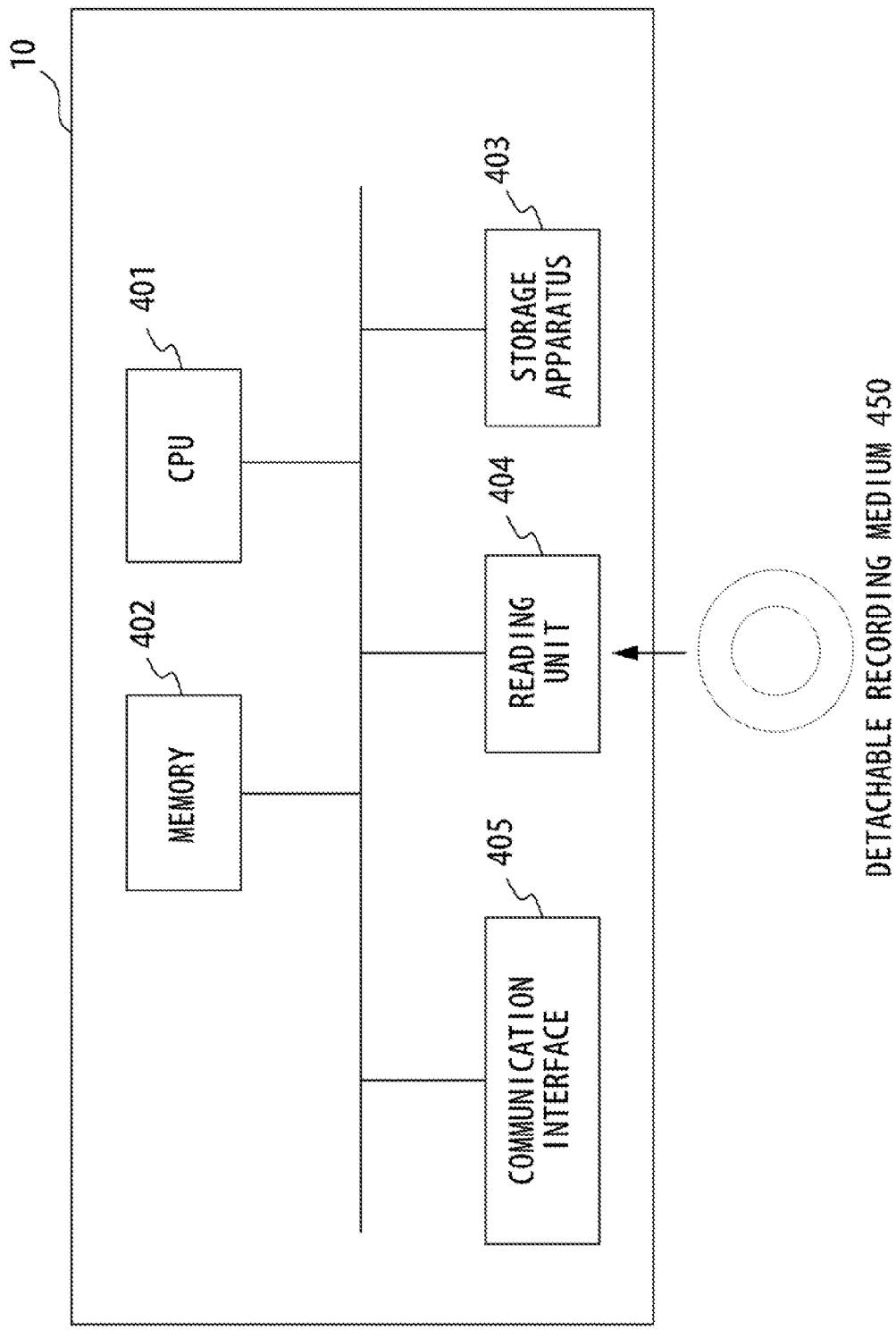
F I G. 1 3

INFORMATION PROCESSING APPARATUS AND DATA REPAIRING METHOD

CROSS-REFERENCE TO RELATED APPLICATION

This application is based upon and claims the benefit of priority of the prior Japanese Patent Application No. 2013-180146, filed on Aug. 30, 2013, the entire contents of which are incorporated herein by reference.

FIELD

The embodiment described herein relates the checking of consistency and a repair process of a file system.

BACKGROUND

Inconsistency in a file system occurs when data destruction due to a malfunction and a failure of the software or the hardware of the file server occurs. When such inconsistency in the file system is left for a long time and the inconsistency is detected by an operation I/O error and the like in the file system, there may be quite a lot of cases in which too many inconsistencies cause difficult restoration.

One of the techniques to search for inconsistency in the file system and repair it is FSCK (file system check). FSCK is one important reliability enhancement function for maintaining the availability of the file system.

However, FSCK has a problem in that an enormous amount of time is required. This is because, for example, a large part of the meta data of the file system that is the processing target must be read out, and the like.

Meanwhile, along with the increase in electronic data in recent years, the scale of file systems made use of by companies has been expanding. In such a situation, it has become difficult to complete the processing of FSCK within the time in which offline execution is possible (for example, within the time in which there are no problems in actual operations such as the time period for the batch process during the night). Furthermore, in operations that have been globalized, access to the data of the file systems has been being made around the clock in more cases. For that reason, it has also become difficult to halt operations in order for the offline execution of FSCK.

According to the situation as described above, a technique for speeding up FSCK in a large-scale file system such as that of a petabyte class is sought. For example, dividing a file system into a plurality of small-scale file systems has been considered. Performing journaling in a file system has also been considered. Journaling is a function to maintain/manage the file update history for the restoration at the time of the occurrence of a failure.

Meanwhile, the techniques described in the respective documents below have been known.

Japanese Laid-open Patent Publication No. 2008-165474
Japanese Laid-open Patent Publication No. 9-6653
Japanese Laid-open Patent Publication No. 2005-250819
Val Henson, Arjan van de Ven, Amit Gud, Zach Brown, "Chunkfs: Using divide-and-conquer to improve file system reliability and repair" HOTDEP'06 Proceedings of the 2nd conference on Hot Topics in System Dependability—Volume 2, Pages 7-7, 2006
Stephen C. Tweedie "Journaling the Linux ext2fs Filesystem" Proceedings of the 4th Annual LinuxExpo, Durham, N.C., 1998

SUMMARY

According to an aspect of the embodiment, an apparatus includes a storing unit a processor. The storing unit includes a first storage area managed by a file system and a second storage area to store data. The processor executes a procedure including performing a repair process including first detecting whether there is any abnormality in data read out from the first storage area, repairing abnormal data that is the data in which abnormality is detected as a result of the first detection, and storing the repaired data in the second storage area, second detecting, when an address of data changed in the repair process and an address of a read-out source of the abnormal data in the first storage area match, whether there is any abnormality in data read out from an area indicated by the address of data changed in the repair process and the address of the read-out source of the abnormal data in the first storage area, repairing and storing, in the second storage area, the data in which abnormality is found as a result of the second detection, and writing the repaired data into the address of the read-out source of the abnormal data in the first storage area, when the address of data changed in the repair process and the address of the read-out source of the abnormal data in the first storage area do not match.

The object and advantages of the invention will be realized and attained by means of the elements and combinations particularly pointed out in the claims.

It is to be understood that both the foregoing general description and the following detailed description are exemplary and explanatory and are restrictive of the invention.

BRIEF DESCRIPTION OF DRAWINGS

FIG. 1 is a functional block diagram illustrating the configuration of an example of an information processing apparatus according to the embodiment.

FIG. 3 illustrates an example of an update map.

FIG. 13 illustrates an example of the hardware configuration of an information processing apparatus.

DESCRIPTION OF EMBODIMENTS

Figure 2:
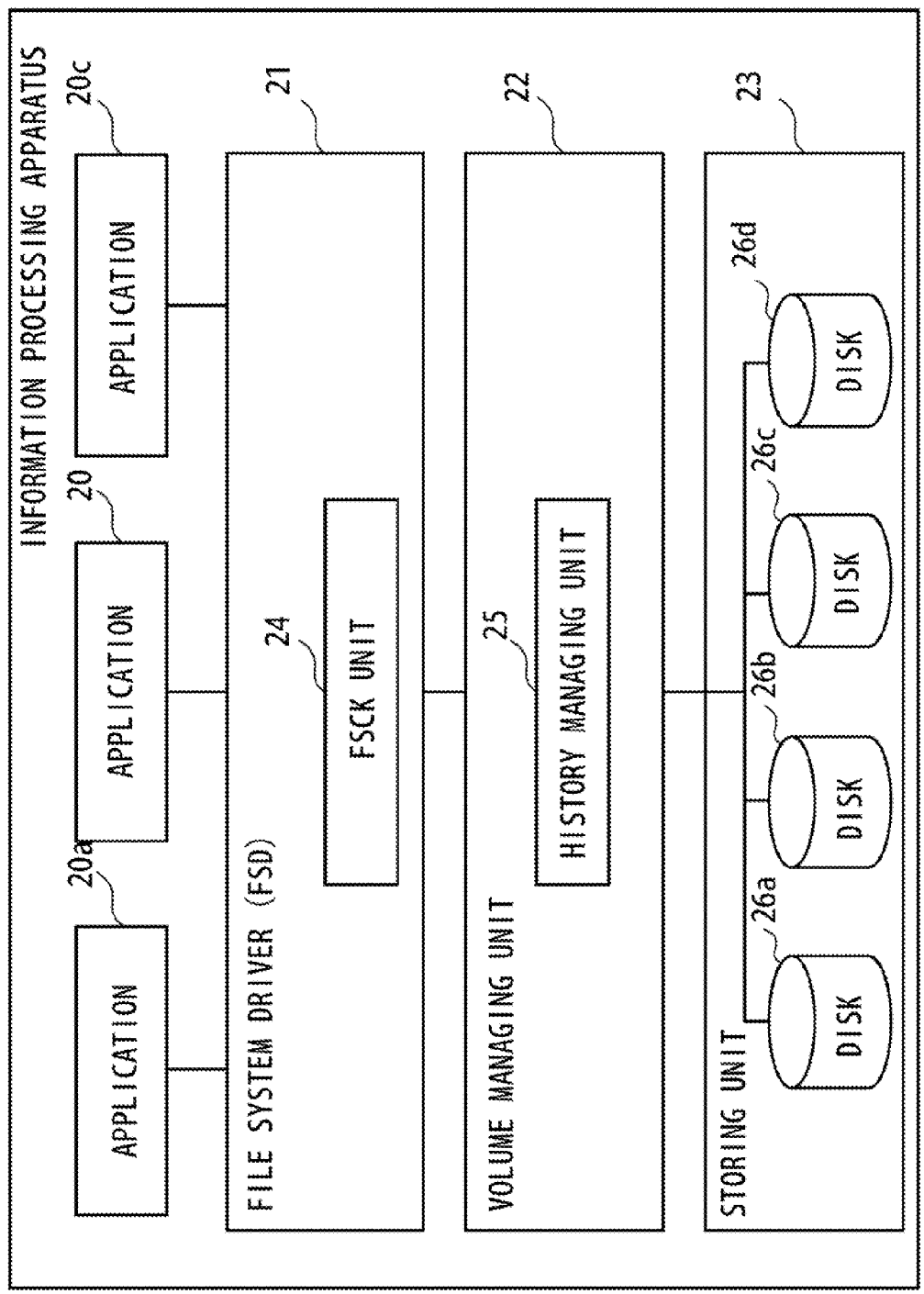
FIG. 2 illustrates an example of the configuration of an information processing apparatus according to the embodiment.

As an example, the technique of dividing a file system into small-scale file systems is limited to a system that allows the operation in a set of file systems of small-scale file systems. Furthermore, a parallel execution of FSCK of many file systems may cause the depletion of the server memory because of it, and there is a limitation in making it smaller scale. For that reason, when the scale of the volume expands beyond a certain degree, it becomes impossible to suppress an increase in the length of the maintenance work time of FSCK and the like.

In addition, by using journaling, even after a sudden stop that becomes a factor in the file system inconsistency, it is possible to repair the inconsistency at a high speed by continuing the journal process. Accordingly, the necessity of FSCK may be reduced. However, there still remains a possibility of an occurrence of a file system inconsistency due to a malfunction in the software or the hardware of the server, and even by using journaling, it is impossible to eliminate the need for FSCK completely.

According to an embodiment, the maintenance work time of a file system may be reduced.

FSCK includes two processes, a consistency check process and an inconsistency repair process. The consistency check process is a process to check the consistency of a file system from various viewpoints. The repair process is a process to repair a block in which inconsistency has been found by the consistency check, so that the inconsistency is revolved.

According to the present embodiment, these consistency check and repair processes are realized by using a snapshot function. Accordingly, it becomes possible to execute FSCK while the file system is in an online condition (a condition that does not involve a system or service stoppage). For the snapshot function, for example, the one provided in RAID (Redundant Arrays of Independent Disks) and LVM (Logical Volume Manager) may be used.

However, while the consistency check and the repair process are performed for a snapshot, input and output due to the normal jobs continue to occur for the file system that is the obtained source of the snap shot. At this time, when there is a conflict between an update process for the file system that is the obtained source of the snapshot and the update target of the inconsistency repair process, there is a risk that a new inconsistency will occur when reflecting the result of the repair process performed for the snapshot on the file system of the obtained source. For example, a case in which the same block is updated in the input and output process according to the jobs and in the repair process of FSCK corresponds to the case of a conflict in the update target. In such a case, if the same consistency check and repair processes are re-executed until the conflict condition is resolved, especially in a file system in which accesses continuously occur in around-the-clock jobs, a risk arises that no repair for the inconsistency will be performed for a long time.

Therefore, in this embodiment, when there is a conflict in the update target, the consistency check and the repair process are re-executed, but at that time, the target of the consistency check and the repair process is narrowed down. Accordingly, the consistency check and the repair process may be realized online and at a high speed. As a result, the availability of the file system is increased since the job continuity is not spoiled, and also, the inconsistency is recovered and repaired earlier, leading to an enhancement in the reliability of the file system.

FIG. 1 is a functional block diagram illustrating the configuration of an example of an information processing apparatus according to the present embodiment. An information processing apparatus 10 includes a storing unit 1, a repairing unit 2, a writing unit 3, and an identifying unit 4.

The storing unit 1 includes a first storage area managed by the file system and a second storage area that stores data.

The repairing unit 2 performs a repair process in which whether the data readout from the first storage area has any abnormality is detected and abnormal data that is data in which an abnormality has been detected according to the result of the detection is repaired and stored in the second storage area. In addition, the repairing unit 2 performs the following actions, when the address of data changed during the repair process in the first storage area and the address of the read-out source of the abnormal data match. That is, the repairing unit 2 first reads out data from the area indicated by the address of data changed during the repair process and by the address of the read-out source of the abnormal data in the first storage area. Then, the repairing unit 2 detects whether there is any abnormality in the read-out data, and repairs data in which an abnormality has been detected according to the result of the detection, and stores it in the second storage area.

The writing unit 3 writes the repaired data into the address of the read-out source of the abnormal data, when the address of data changed during the repair process and the address of the read-out source of the abnormal data in the first storage area do not match.

The identifying unit 4 identifies the address at which data updated within a prescribed period is stored in the first storage area. Then, the repairing unit 2 performs the repairing process in which whether there is any abnormality in data read-out from the address identified in the first storage area is detected, and abnormal data that is data in which an abnormality has been detected as a result of the detection is repaired and stored in the second storage area.

In addition, the repairing unit 2 performs the following actions, when the address of data changed during the repair process and the address of the read-out source of the abnormal data in the first storage area match. That is, the repairing unit 2 first detects whether there are any abnormalities in data read-out from the area indicated by the address at which data updated within a prescribed period is stored, in the address of the read-out source of the abnormal data, and by the address of data changed during the repair process in the first storage area. Then, the repairing unit 2 repairs data in which an abnormality has been detected according to the result of the detection, and stores it in the second storage area.

Meanwhile, the writing unit 3 writes the repaired data into the address of the read-out source of the abnormal data in the first storage area, when the address of data changed during the repair process area and the address of the read-out source of the repaired data in the abnormal data in the first storage do not match.

FIG. 2 illustrates an example of the configuration of the information processing apparatus according to the present embodiment. In FIG. 2, the information processing apparatus includes applications 20a, 20b, 20c, a file system driver 21, a volume managing unit 22, and a storing unit 23.

The applications 20a, 20b, 20c access a file or a directory stored in the storing unit 23, and perform data read-out and write-in through a file system driver. In the explanations below, when the applications 20a, 20b, 20c are not distinguished in particular, they are described as the application 20. The application 20 may provide services used by a user who uses the information processing apparatus for normal jobs, or may perform data exchange with another terminal.

The file system driver 21 (in the explanations below, described as the FSD 21) manages the file system created by the storing unit 23. The FSD 21 accepts a request for data read-out and write-in from the application 20, and issues an instruction for the data read-out and write-in to the volume managing unit 22, while maintaining the consistency of the file system. The FSD 21 includes a file system consistency check unit. The file system is a function for managing data recorded in a storage apparatus.

The file system consistency check unit (in the explanations below, described as the FSCK unit 24) is a sub-module of the FSD 21, and performs a consistency check and repair of the inconsistency in the file system. In addition, the FSCK unit 24 makes a request for input and output with respect to the file or directory received from the application 20, to the volume managing unit 22.

The FSCK unit 24 performs the consistency check and the repair process of the inconsistency in the file system at prescribed time intervals. Then, the FSCK unit 24 performs the following consistency check and the repair process, targeted at a block in which an update has occurred since the point in time at which consistency was confirmed by the last consistency check and the repair process.

As the consistency check of the file system, for example, the FSCK unit 24 checks the consistency of the respective files (including directories) of the file system, and management information (meta data) of those files. Here, the management information is, for example, information of inode. In addition, for example, the FSCK unit 24 checks the consistency between a plurality of pieces of management information.

Specifically, for example, the FSCK 24 performs a file assignment check, a block assignment check, and a directory configuration check.

In the file assignment check, the FSCK unit 24 checks the consistency of the change in inode assignment information indicating the presence/absence of assignment of management information (inode for example) to the file within a prescribed period and the change in its management information within a prescribed period.

In the block assignment check, the FSCK unit 24 checks the consistency of the change of block assignment information indicating the presence/absence of an assignment of the block of the file system to the file within a prescribed period, and the change of the assignment of the unit storage area to management target information based on the management information within a prescribed period. In addition, the FSCK unit 24 checks the consistency of the change of the block assigned to the file within a prescribed period, and the change of the number of blocks assigned to the file within a prescribed period.

In the directory configuration check, the FSCK unit 24 calculates the number of directories to which the file belongs, on the basis of the change within a prescribed period, of the entry of the file of the directory. In addition, the FSCK unit 24 calculates the changes in a prescribed period of the number of directories to which the file belongs, set in the management information of the file. Then, the FSCK unit 24 checks the inconsistency in the number of directories to which the file belongs, on the basis of the entry of the file into the directory, and the number of directories to which the file belongs, on the basis of the management information of the file.

In addition, the FSCK unit 24 issues an instruction to the volume managing unit 22 so as to perform obtaining of a snapshot at a prescribed time of a logical volume that is the target of the consistency check, and a clone based on the snapshot.

The volume managing unit 22 manages a plurality of disks included in the storing unit 23 and data on the disks. In addition, the volume managing unit 22 performs data read-out and write-in from/to the storing unit 23 according to input and output requests from the FSCK unit 24.

Specifically, for example, the volume managing unit 22 manages one or more of disks 26a, 26b, 26c, 26d as a logical drive. Then, on the logic drive, the volume managing unit 22 sets a logical volume that is a virtual logical partition, and creates a file system on this logical volume.

The volume managing unit 22 includes a history managing unit 25. The history managing unit 25 creates a snapshot that enables restoration of the disk image at a certain point in time, in units of the logical volume, according to an instruction from the FSCK unit 24, and manages changes from a prescribed point in time in the logical volume. In addition, the history managing unit 25 creates a clone of a snapshot used for the consistency check and the repair process, and manages changes made to the clone.

The storing unit 23 includes one or more disks 26a, 26b, 26c, 26d. For the disks 26a, 26b, 26c, 26d, a logical volume is set by the volume managing unit 22, and a file system is created on the logical volume.

The storing unit 23 is an example of the storing unit 1. The FSD 21 is an example of the repairing unit 2, the writing unit 3, and the identifying unit 4.

Next, the realization method of the snapshot is explained. Meanwhile, in the following explanations, the logical volume that is the obtaining target of the snapshot is described as the obtaining target volume. In addition, by using the snapshot, it becomes possible to restore the condition of data that is the obtaining target volume at a prescribed point in time, and this restorable point in time is described as a stationary point. Furthermore, in the present embodiment, the obtaining target of the snapshot is a prescribed logical volume in the online status that is available for use from the application 20. In the following explanations, the logical volume in the online status that is available for use from the application 20 is described as an online volume.

As an example of the realization method of the snapshot, in the present embodiment, it is realized not by copying all the contents of the data that is the obtaining target volume, but by saving, in a prescribed storage area, the data before a change of the data of the block that has been changed after the stationary point. In this method, data of the block that has not been changed after the stationary point, and a pointer to the block (the block number or the LBA (Logical Block address)) is recorded in a prescribed storage area. Meanwhile, in the following explanations, the prescribed storage area that is the saving destination to save the data before a change of the block that has been changed after the stationary point is described as the saving area.

When referring to the snapshot, for the data of the block unchanged after the stationary point, using the stored pointer, the data of the block that is the obtaining target volume at the time of the reference is referred to. This is because, since the data is not changed between the stationary point and the reference time point, the data of the obtaining target volume at the time of the reference may be used as the data of the block at the stationary point. Then, for the data of the block that has been changed after the stationary point, the data saved in the saving area is referred to. As described above, it becomes possible to restore the disk image of the obtaining target volume at the stationary point. In the following explanations, the image after a change representing the contents after a change of the block that has been changed after the stationary point may be described as the AI (After Image). In addition, the image representing the contents before a change of the block that has been changed after the stationary point may be described as BI (Before Image).

Next, an example of the data configuration to realize the specific snapshot function is explained. In order to realize the snapshot function, data in the obtaining target volume, data (BI) before a change of the data changed after the stationary point saved in the saving area, and, for example, the following two management tables are used. The two management tables are, namely, a management table (update map) for identifying the block that has been changed after the stationary point, from the blocks of the obtaining target volume, and a management table (saving map) for identifying the address to which the data before a change of the block that has been changed after the stationary point is saved.

The update map is a management table in which the block number (or the LBA) of each block included in the obtaining target volume, and information indicating whether or not the data of the block number has been updated are associated. According to the update map, which block of the obtaining target volume has been changed after the stationary point is identified.

FIG. 3 illustrates an example of the update map. In FIG. 3, an update map 41 is in the data structure of the variable length array of the 64-bit integers. Each bit of the array is associated one-to-one with each block of the file system, and the value of each bit indicates the presence/absence of an update after the stationary point of the corresponding block. That is, when there has been an update in the block, "1" is stored as the value of the corresponding bit value, and when there has been no change in the block, "0" is stored as the value of the corresponding bit. Meanwhile, in the case of FIG. 3, the number of entries in the update map is the volume size/the block size/64.

The saving map obtains the address (or the block number) of the address as a key, and sends back the address of the saving area in which the data of the BI corresponding to the key is saved. According to the saving map, from the address of the obtaining target volume, the address of the saving area in which the data before a change of the address is saved is identified.

Figure 4:
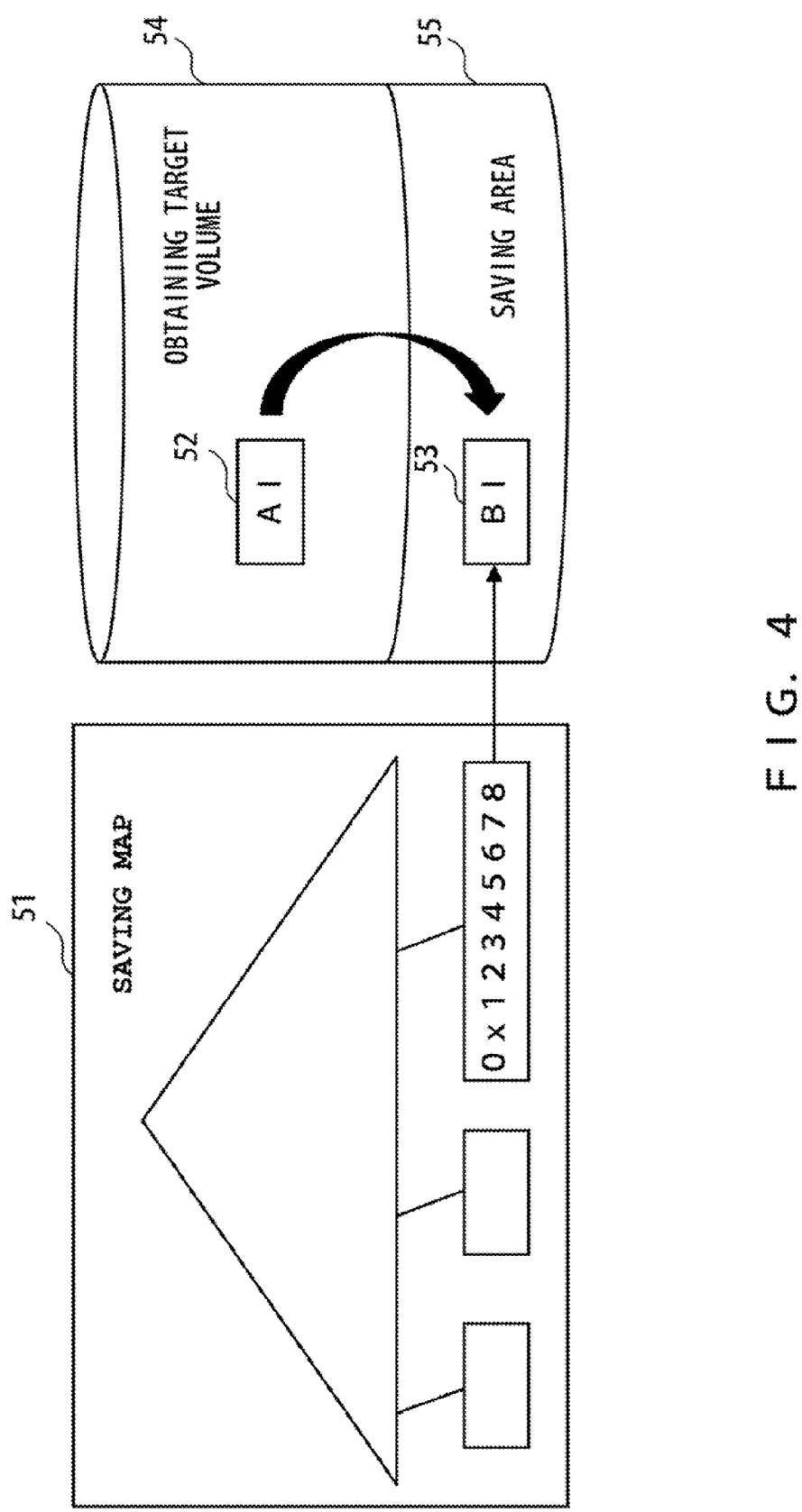
FIG. 4 illustrates an example of a saving map of a snapshot.

FIG. 4 illustrates an example of the saving map of the snapshot. In FIG. 4, a saving map 51 of the snapshot is in the B+tree structure. In the example in FIG. 4, the data of a block 52 of an obtaining target volume 54 is updated, and the data before an update is saved in a block 53 of a saving area 55. At this time, in the saving map 51 of the snapshot, with the address (LBA) of the block 52 as a key, the address of the block 53 is stored in the record corresponding to the key (the LBA of the block 52). Meanwhile, in B+tree, the record is stored in the lowest layer (leaf node) of the tree, and the key is stored in the internal node.

Meanwhile, the data structure of the saving map 51 is not limited to B+tree, and as long as the address of the obtaining target volume is obtained as a key and the address of the saving area in which data of the BI corresponding to the key is sent back, various algorithms may be used.

Next, actions from the start of the obtaining of the snapshot are explained. Meanwhile, in the present embodiment, the obtaining start time point of the snapshot is assumed as the stationary point. Upon receiving the obtaining request for a snapshot from the FSCK unit 24, the history managing unit 25 first creates an update map corresponding to the obtaining target volume. In the update map at the point in time of the creation, values of all the bits corresponding to the block in the obtaining target volume are initialized as 0. In addition, the history managing unit 25 secures the saving area 55 for saving the BI in a prescribed storage area. The saving area 55 may be secured in the obtaining target volume of the snapshot, or may be secured in another logical volume of the storing unit 23. The history managing unit 25 further creates the saving map 51.

After that, when a change request is generated from the application 20 to the data of the obtaining target volume (online volume), the history managing unit 25 saves the data before a change of the block that is the change target in the saving area 55. Then, the history managing unit 25 updates the value of the bit of the update map 41 corresponding to the address of the block that is the change target to "1". Next, the history managing unit 25 sets the saving map 51 so that the address of the saving area 55 in which the data (BI) before a change is saved may be obtained, with the address of the block that is the change target as the key. That is, the history managing unit 25 adds, to the saving map 51, a record of the address of the saving area 55 in which the data (BI) before a change is stored, with the address of the block before a change as the key. Then, the history managing unit 25 changes the data of the online volume to the contents of the change request from the application 20.

Next, actions at the time of a snapshot reference are explained. Here, referring to the snapshot means obtaining the image of the obtaining target at the stationary point.

The history managing unit 25 obtains, in response to the reception of the reference request of a snapshot from FSCK unit 24, data of the block in which there has been a change between the stationary point and the time of the reference from the saving area 55, and obtains the block in which there has been no change from the obtaining target volume 54 at the time of the reference. Then, the history managing unit 25 integrates the obtained data of the respective blocks and sends it back to the FSCK unit 24.

Specifically, to obtain data of the block in which there has been a change between the stationary point and the time of the reference, the history managing unit 25 first obtains the address of the block in which there has been a change after the stationary point, referring to the update map 41 of the snapshot. Then, the history managing unit 25 inputs the address of the block in which there has been a change as a key into the saving map 51, and obtains the address of the saving area 55 in which the data (BI) before the change of the block in which there has been a change. Then, the history managing unit 25 obtains the data (BI) before the change stored in the address of the obtained address of the saving area.

Meanwhile, for the data of the block in which there has been no change after the stationary point, the history managing unit 25 obtains it from the block of the obtaining target volume (online volume) at the time of the reference. Then, the history managing unit 25 integrates the BI of the block in which there has been a change after the stationary point and the data of the block in which there has been no change after the stationary point, and sends back the image of the obtaining target volume at the time of the stationary point to the FSCK unit 24.

Next, actions at the time of discarding the snapshot are explained.

Upon receiving a discarding request for a snapshot from the FSCK unit 24, the history managing unit 25 deletes the update map 41 and the saving map 51, deletes the block saved in the saving area 55, and releases the saving area 55.

Next, the obtaining of the clone for a snapshot is explained. In the present embodiment, the clone for a snapshot (in the explanations below, described simply as the clone) is temporary data used for performing the consistency check and the repair process of the file. That is, in the repair process of the file, data of the clone is repaired first, and after it is checked whether there is no problem in reflecting the repair done to the clone in the online volume, the repair is reflected in the online volume.

Meanwhile, the change generated to the snapshot is a change made by the input and output from the application 20 to the online volume, and the change generated to the clone is a change done in the repair process.

As an example of the realization method of the clone, it is realized not by copying all the contents of the data of the obtaining target volume of the snapshot, but by saving the data after a change of the block that has been changed after a prescribed point in time (stationary point) in a prescribed storage area. In this method, data of the block that has not been changed after the stationary point is not copied, and a pointer (the block number or the LBA) to the block is recorded. Meanwhile, in the following explanations, the storage area that is the storage destination to store the data after a change of the block that has been changed after the stationary point is described as the repaired data storage area. The repaired data storage area may be secured in the same logical volume as the saving area 55, or may be secured in a different logical volume.

The clone is created on the basis of the snapshot, and is created so that the clone and the snapshot to be the base of the clone have the same stationary point.

The clone at the stationary point has the same contents as the snapshot at the stationary point, and referring to the clone at the stationary point is the same as referring to the snapshot at the stationary point. Then, when a change is generated in the data of a prescribed block to the clone, the data of the block after a change is stored in the repaired data storage area.

In order to manage the change to the data of the clone by the repair process, in the same manner as the snapshot, an update map is used. In the update map of the clone, the block number (or the LBA) of the clone and data indicating whether or not the data of the block number has been changed are associated. Here, the block number (or the LBA) of the block is the same as the block number (or the LBA) of the obtaining target volume of the corresponding snapshot.

In addition, in order to identify the address of the repaired data storage area in which the data after the change by the repair process is stored, a storage map is used. The storage map obtains the address (or the block number) of the address of the clone as a key, and sends back the address of the repaired data storage area in which the data after the change corresponding to the key is stored. According to the storage map, from the address of the clone, the address of the repaired data storage area in which the data after the change corresponding to the key is stored is identified.

Figure 5:
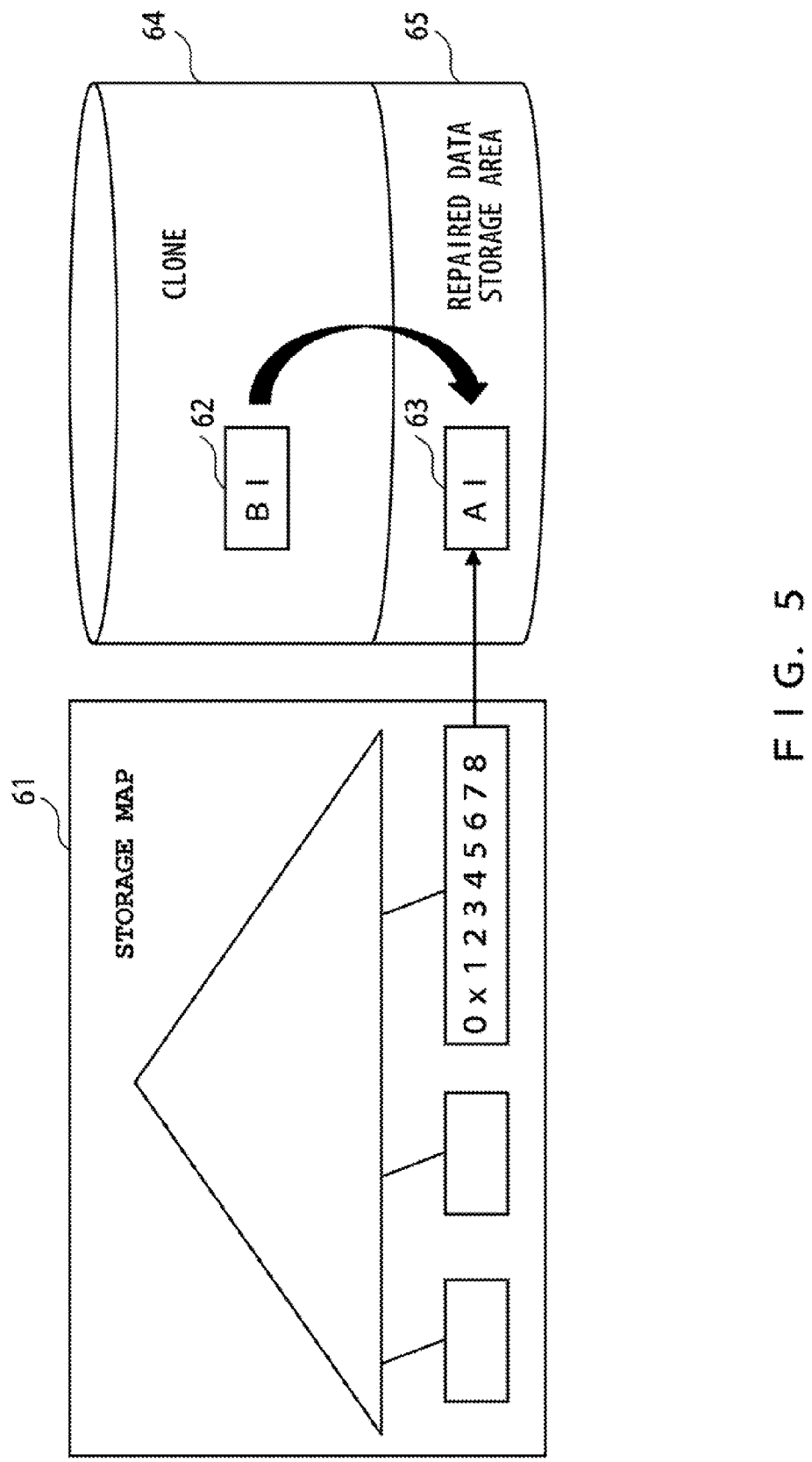
FIG. 5 illustrates an example of a storage map of a clone.

FIG. 5 illustrates an example of the storage map of a clone. In FIG. 5, a storage map 61 of the clone is in the B+tree structure. In the example in FIG. 5, the data of a block 62 of a clone 64 is updated, and the data before an update is saved in a block 63 of a repaired data storage area 65. At this time, in the storage map 61 of the clone, with the address (LBA) of the block 62 as a key, the address of the block 63 is stored in the record corresponding to the key (the LBA of the block 62).

Meanwhile, the data structure of the storage map 61 is not limited to B+tree, and as long as the address of a clone is obtained as a key and the address of the repaired data storage area to which data of the AI corresponds to the key is sent back, various algorithms may be used.

Next, operation actions from the start of the obtaining of the clone are explained. Meanwhile, in the present embodiment, the obtaining start time point of the clone is assumed as the stationary point of the clone.

Upon receiving the obtaining request for a clone from the FSCK unit 24, the history managing unit 25 first creates an update map corresponding to the snapshot to be the base. In the update map at the point in time of the creation, values of all the bits corresponding to the block in the snapshot are initialized as 0. Meanwhile, since the snapshot is created on the basis of the obtaining target volume, it may be said that the block of the update map of the clone corresponds to the block in the obtaining target volume. In addition, the history managing unit 25 secures the repaired data storage area 65 for saving the AI in a prescribed storage area. The repaired data storage area 65 may be secured in the same logical volume as the saving area 55 of the snapshot, or may be secured in another logical volume. The history managing unit 25 further creates the storage map 61 of the clone.

After that, when a change request is generated from the FSCK unit 24 to the data of the clone in the inconsistency repair process, the history managing unit 25 saves the data after a change of the block that is the change target in the repaired data storage area 65 of the clone. Then, the history managing unit 25 updates the value of the bit of the update map corresponding to the address of the block that is the change target to "1". Next, the history managing unit 25 sets the storage map 61 of the clone so that the address of the repaired data storage area 65 in which the data (AI) after a change is saved may be obtained, with the address of the block that is the change target as the key. That is, the history managing unit 25 adds, to the storage map 61, a record of the address of the repaired data storage area 65 in which the data (AI) before a change is stored, with the address of the block before a change as the key.

Next, actions at the time of reference to the clone are explained. Upon receiving a reference request to the clone from the FSCK unit, the history managing unit 25 obtains data of the block in which there has been a change between the stationary point and the time of the reference from the repaired data storage area 65, and obtains the block in which there has been no change from the snapshot at the stationary point. Then, the history managing unit 25 integrates the obtained data of the respective blocks and sends it back to the FSCK unit 24.

Specifically, to obtain the data of the block in which there has been a change between the stationary point and the time of the reference, the history managing unit 25 first obtains the address of the block in which there has been a change after the stationary point, referring to the update map of the clone. Then, the history managing unit 25 inputs, to the storage map 61 of the clone, the address of the block in which there has been a change as the key, and obtains the address of the repaired data storage area 65 in which the data (AI) after an update of the block in which there has been a change is stored. Then, the history managing unit 25 obtains the data (AI) after a change stored in the obtained address of the repaired data storage area 65.

Meanwhile, for the data of the block in which there has been no change after the stationary point, the history managing unit 25 obtains it from the block of the snapshot at the stationary point. This is because, by referring to the snapshot, the data of the block at the stationary point may be obtained. Therefore, the history managing unit 25 obtains the data of the block in which there has been no change after the stationary point by referring to the snapshot.

Then, the history managing unit 25 integrates the AI of the block in which there has been a change after the stationary point and the data of the block in which there has been no change after the stationary point, and sends back the image of a clone at the stationary point to the FSCK unit 24.

Next, actions at the time of discarding the clone are explained.

Upon receiving a discarding request for a clone from the FSCK unit 24, the history managing unit 25 deletes the update map 41, the storage map 61 of the clone, deletes the block saved in the repaired data storage area 65, and releases the repaired data storage area 65.

As described above, the functions of the snapshot and the clone are realized. In the snapshot and the clone, since only the value of the changed block is duplicated, the amount of memory used for the consistency check and the repair process may be suppressed.

The FSCK unit 24 reflects the contents of the repair process done to the clone in the obtaining target volume. While a prescribed time is required for the consistency check and the repair process of the file to the clone, during this time, there is a possibility that various changes may be added from the application 20 to the obtaining target volume in the online status. Therefore, there is a possibility that data of the address of the repair process target has been changed already in the online volume by the application 20, and in that case, there is a possibility that a new inconsistency will occur if the data of the clone to which the repair process has been done is reflected in the online volume.

Therefore, in the present embodiment, first, the FSCK unit 24 judges whether or not the address of the data of the clone changed by the repair process and the address of the data of the online volume changed by the application 20 match. Then, when it is determined that they do not match, the FSCK unit 24 reflects the repaired data of the clone in the online volume.

On the other hand, when the address of the data of the clone changed by the repair process and the address of the data of the online volume changed by the application 20 match, the FSCK unit 24 does not reflect the repaired data on the clone in the online volume. In this case, the FSCK unit 24 narrows down the target area and re-executes the consistency check and the repair process.

The re-check of the consistency and the narrowing down of the range of the repair process are explained with reference to FIG. 6 through FIG. 9.

First, a case is explained in which, when the contents of the repair process done to the clone is reflected in the obtaining target volume, new inconsistencies do not occur, and no re-check of consistency is needed. The case in which no re-check of consistency is needed is, in other words, a case in which there is no match between the block of data to which the repair process has been done and the block of the obtaining target volume changed by the input and output from the application 20 during the inconsistency check and the repair process.

Figure 6:
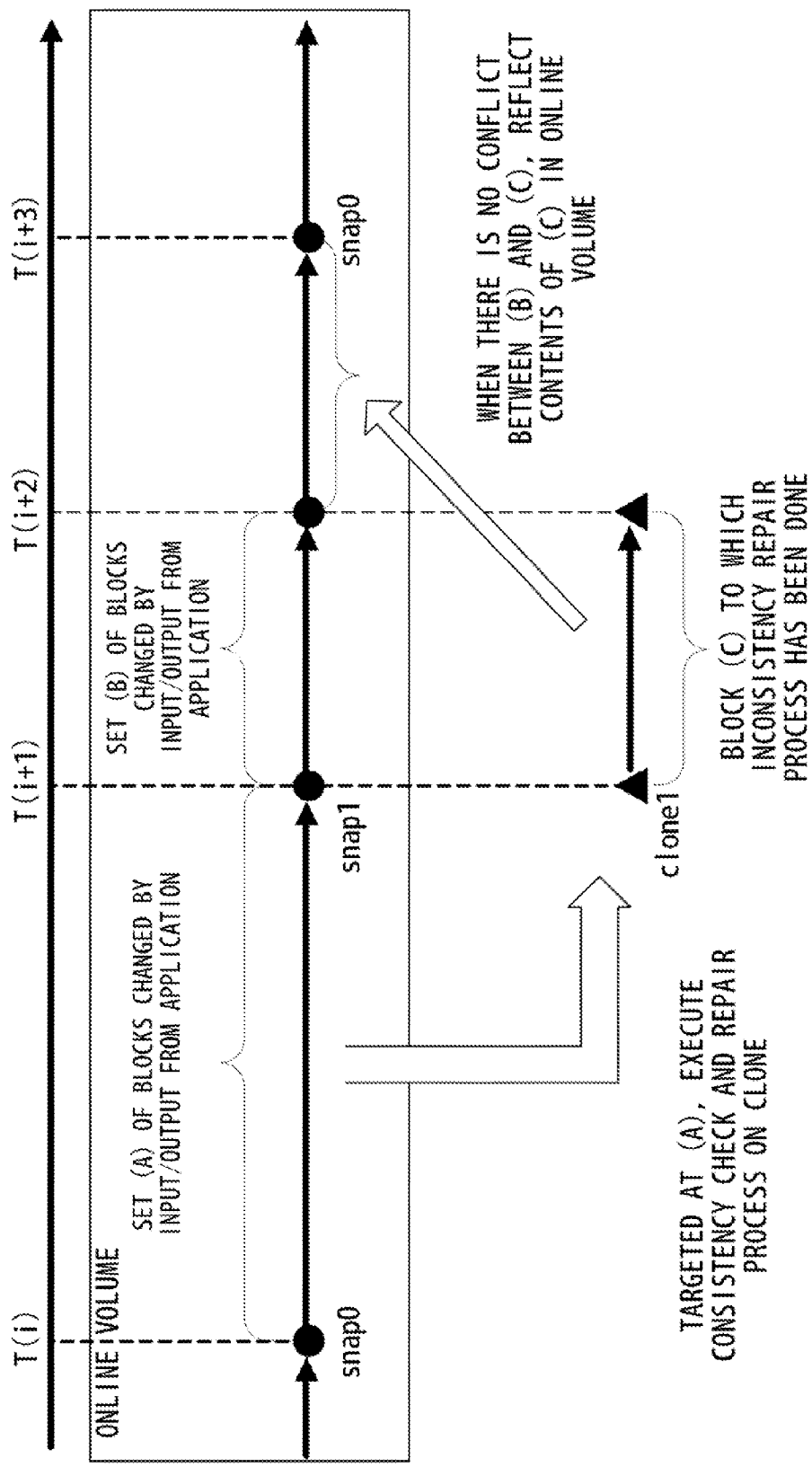
FIG. 6 is a diagram illustrating the relationship between a clone and an online volume in a consistency check and a repair process.

FIG. 6 is a diagram illustrating the relationship between the clone and the online volume in the consistency check and the repair process. In FIG. 6, the horizontal axis represents the time. Then, the time T(i) is a point in time at which it is guaranteed that there is consistency in the file system of the online volume. At this time T(i), the obtaining of a snapshot "snap0" whose stationary point is T(i) starts. In addition, at the time T(i+1), the obtaining of a snapshot "snap1", a clone "clone1" whose stationary point is T(i+1) starts.

In FIG. 6, the FSCK unit 24 starts the consistency check at the time T(i+1). Specifically, at T(i+1), the FSCK unit 24 first obtains a set (described as the set A) of blocks that are the target of the consistency check and the repair process. Here, the set A is blocks of the online volume that have been changed by the application 20 between T(i) and T(i+1). In order to obtain the set A, the FSCK unit 24 transmits an obtaining request for the set A to the history managing unit 25. Upon receiving the obtaining request, the history managing unit 25 refers to the update map 41 of snap0, obtains the set A of blocks whose bit value in the update map 41 is "1", and sends back the obtained set A of the blocks to the FSCK unit 24.

Then, the FSCK unit 25 performs the consistency check and the repair process on the clone, to the block included in the set A. In the consistency check, the FSCK unit 24 uses the data at T(i) and the data at T(i+1) of the block included in the set A.

In order to obtain the data at T(i) of the block included in the set A, the FSCK unit 24 transmits an obtaining request for the data at T(i) of the block included in the set A to the history managing unit 25. Upon receiving the obtaining request, the history managing unit 25 first inputs each of the block included in the set A as a key into the saving map 51 of snap0, and obtains the address of the saving area in which the BI of the block of the set A is saved. Then, the history managing unit 25 obtains data of the BI stored in the obtained address of the saving area, and sends back the data of the BI to the FSCK unit 24. The data of the BI obtained as described above is the data of the block at T(i).

In addition, for the data at T(i+1) of the block included in the set A, the FSCK unit 24 also transmits an obtaining request for data to the history managing unit 25. Upon receiving the obtaining request, the history managing unit 25 obtains the data of the block of the online volume included in the set A at the time point of T(i+1), and sends it back to the FSCK unit 24.

Using the data at T(i) and the data at T(i+1) of the block included in the set A obtained as described above, the FSCK unit 24 performs the consistency check. Specifically, for example, the FSCK unit 24 performs a file assignment check, a block assignment check, a directory configuration check, and the like.

The FSCK unit 24 performs a repair process of blocks determined as having an occurrence of inconsistency as a result of the execution of the consistency check to the set A. Meanwhile, the FSCK unit 24 performs the repair process to clone1. The block changed in the repair process is managed by the update map and the storage map 61 of clone1.

Here, blocks determined as having an occurrence of inconsistency are divided into two types. One is a block that becomes the repair target actually, and the other is a block that is not repaired actually due to the inconsistency being resolved by the repair of another block. Here, in the blocks determined as having an occurrence of inconsistency, a set of blocks that becomes the repair target actually is described as the set C, and a set of blocks that are not repaired actually is described as the set a. For example, when the same inode number is assigned to two files in an overlapped manner, by repairing the inode number assigned to one of the files (file X), the inconsistency in the other file (file Y) is resolved. In this case, it follows that the block of the repaired file X is included in the set C, and the block of the file Y that is not repaired actually is included in the set a.

Here, it is assumed that the consistency check and the repair process started from T(i+1) ends at T(i+2). Then, the FSCK unit 24 obtains, at T(i+2), blocks of the online volume changed by the application 20 between T(i+1) and T(i+2) (the set of the blocks is described as the set B). That is, the FSCK unit 24 transmits, at T(i+2), an obtaining request for the set B to the history managing unit 25. Upon receiving the obtaining request for the set B, the history managing unit 25 refers to the update map 41 of snap1, identifies the block whose value of the bit is "1" as a block included in the set B, and sends it back to the FSCK unit 24. In addition, the FSCK unit 24 transmits an obtaining request for the set C to the history managing unit 25. Upon receiving the obtaining request for the set C, the history managing unit 25 obtains the set C of the blocks to which the repair process has done on the clone. That is, the history managing unit 25 refers to the update map of clone1, and identifies the block whose value of the bit is "1" as a block included in the set C. Then, the history managing unit 25 sends back the identified set C to the FSCK unit 24.

Then, the FSCK unit 24 judges whether or not a block included in common in both the set C of blocks to which the repair process has been done on the clone and the set B of blocks of the online volume changed by the application 20 between T(i+1) and T(i+2) exists.

When it is determined that no block included in common in both the set C and the set B exists, the FSCK unit 24 issues an instruction to the history managing unit 25 to reflect the contents of the repair process in the online volume. Upon receiving the instruction for reflecting, the history managing unit 25 first inputs the address of each block included in the set C as a key into the storage map 61 of the clone1, and obtains the address of the repaired data storage area 65 in which the data after the repair of each block included in the set C is stored. Then, the history managing unit 25 stores the data of the obtained address in the corresponding address of the online volume, that is, the address input as a key into the storage map 61.

This reflecting process ends at T(i+3). At T(i+3), the file system of the online volume is in a consistent condition. Meanwhile, the time difference between T(i+2) and T(i+3) is small.

From the point in time at which the consistency of the file system is guaranteed to the point in time at which the repair contents of the clone are reflected in the online volume is a series of the consistency check and the repair process, and the series of the consistency check and the repair process is continued at prescribed time internals. That is, in FIG. 6, from T(i) to T(i+3) is a series of the consistency check and the repair process, and when the series of the processes are completed, with T(i+3) as T(i), the next series of the consistency check and the repair process starts.

Next, the relationship between the clone and the online volume in a case in which the re-execution of the consistency check and the repair process is performed is explained. Meanwhile, the re-execution of the consistency check and the repair process is performed in a case in which a block included in common in both the set C and set B in FIG. 6 exists.

Figure 7:
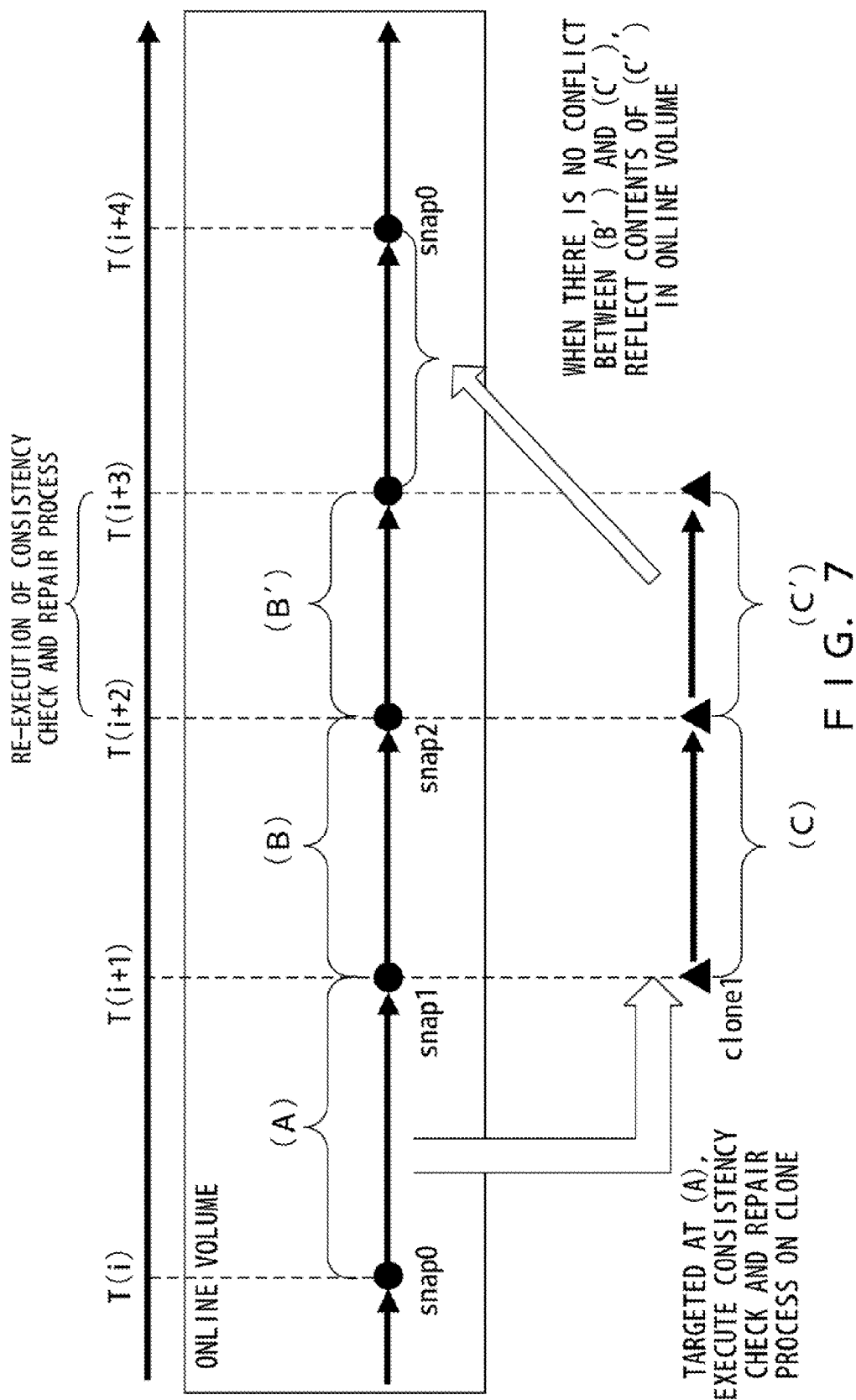
FIG. 7 is a diagram illustrating the relationship between a clone and an online volume in a re-execution of a consistency check and a repair process.

FIG. 7 is a diagram illustrating the relationship between the clone and the online volume in the re-execution of the consistency check and the repair process. Until the FSCK unit 24 determines whether or not a block included in common in both the set C and the set B exists at time T(i+2), the consistency check and the repair process are the same actions as in FIG. 6. When it is determined that a block included in common in both the set C and the set B exists as a result of the judgment at T(i+2), the FSCK unit 24 narrows down the target and performs re-execution of the consistency check and the repair process.

In the re-execution of the consistency check and the repair process, the FSCK unit 24 sets the target of the consistency check and the repair process as the set a∪B∪(A∩C) in the last consistency check and repair process.

In FIG. 7, the FSCK unit 24 starts the re-execution of the consistency check and repair process at T(i+2). Specifically, at T(i+2), the FSCK unit 24 first sets a set A' of the blocks that are the target of the re-execution of the consistency check and the repair process as the a∪B∪(A∩C) in the last consistency check and repair process. Then, the FSCK unit 24 starts the obtaining of a snapshot "snap2" and a clone "clone2". That is, the FSCK unit 24 issues an instruction to the history managing unit 25 to start the obtaining of snap2 and clone2.

Then, the FSCK unit 24 performs the consistency check and the repair process to the block included in the set A'. In the consistency check, the FSCK unit 24 uses the data at T(i) and the data T(i+2) of the block included in the set A'.

The data of the block included in the set A' at T(i) is obtained in the same manner as the data at T(i) of the block included in the set A.

Meanwhile, for the data of the block included in the set A' at T(i+2), the FSCK unit 24 issues an obtaining request for the block included in the set A' to the history managing unit 25. Upon receiving the obtaining request, the history managing unit 25 refers to and obtains the data of the block included in the set A' of the online volume, at the point in time of T(i+2), and sends it back to the FSCK unit 24.

Using the data at T(i) and the data at T(i+2) of the block included in the set A' obtained as described above, the FSCK unit 24 performs the re-execution of the consistency check. Specifically, for example, the FSCK unit 24 performs a file assignment check, a block assignment check, a directory configuration check, and the like.

The FSCK unit 24 performs the repair process of the blocks determined as having an occurrence of inconsistency as a result of the re-execution of the consistency check to the set A'. Here, a set of blocks that becomes the repair target actually is described as the set C', and a set of blocks that are not repaired actually is described as the set a'.

In FIG. 7, it is assumed that the consistency check and the repair process started from T(i+2) ends at T(i+3). Then, the FSCK unit 24 obtains, at T(i+3), the address of blocks of the online volume changed by the application 20 between T(i+2) and T(i+3) (the set of the blocks is described as the set B'). That is, the FSCK unit 24 transmits, at T(i+3), an obtaining request for the set B' to the history managing unit 25. Upon receiving the obtaining request for the set B', the history managing unit 25 refers to the update map 41 of snap2, identifies the block whose value of the bit is "1" as a block included in the set B'. The FSCK unit 24 obtains a set C' of blocks to which the repair process is executed on the clone. In addition, the FSCK unit 24 transmits an obtaining request for the set C' to the history managing unit 25. Upon receiving the obtaining request for the set C', the history managing unit 25 obtains refers to the update map of clone2, and identifies the block whose value of the bit is "1" as a block included in the set C'. Then, the history managing unit 25 sends back the identified set C' to the FSCK unit 24.

Then the FSCK unit 24 judges whether or not a block included in common in both the set C' and the set B' exists.

When it is determined no block included in common in both the set C' and the set B' exists, the FSCK unit 24 issues an instruction to the history managing unit 25 to reflect the contents of the repair process in the online volume. Upon receiving the instruction for reflecting, the history managing unit 25 first inputs the address of each block included in the set C' as a key into the storage map 61 of the clone2, and obtains the address of the repaired data storage area 65 in which the data after the repair of each block included in the set C' is stored. Then, the history managing unit 25 stores the data of the obtained address in the corresponding address of the online volume, that is, the address input as a key into the storage map 61 of clone2.

This reflecting process ends at T(i+4). At T(i+4), the file system of the online volume is in a consistent condition.

Figure 8:
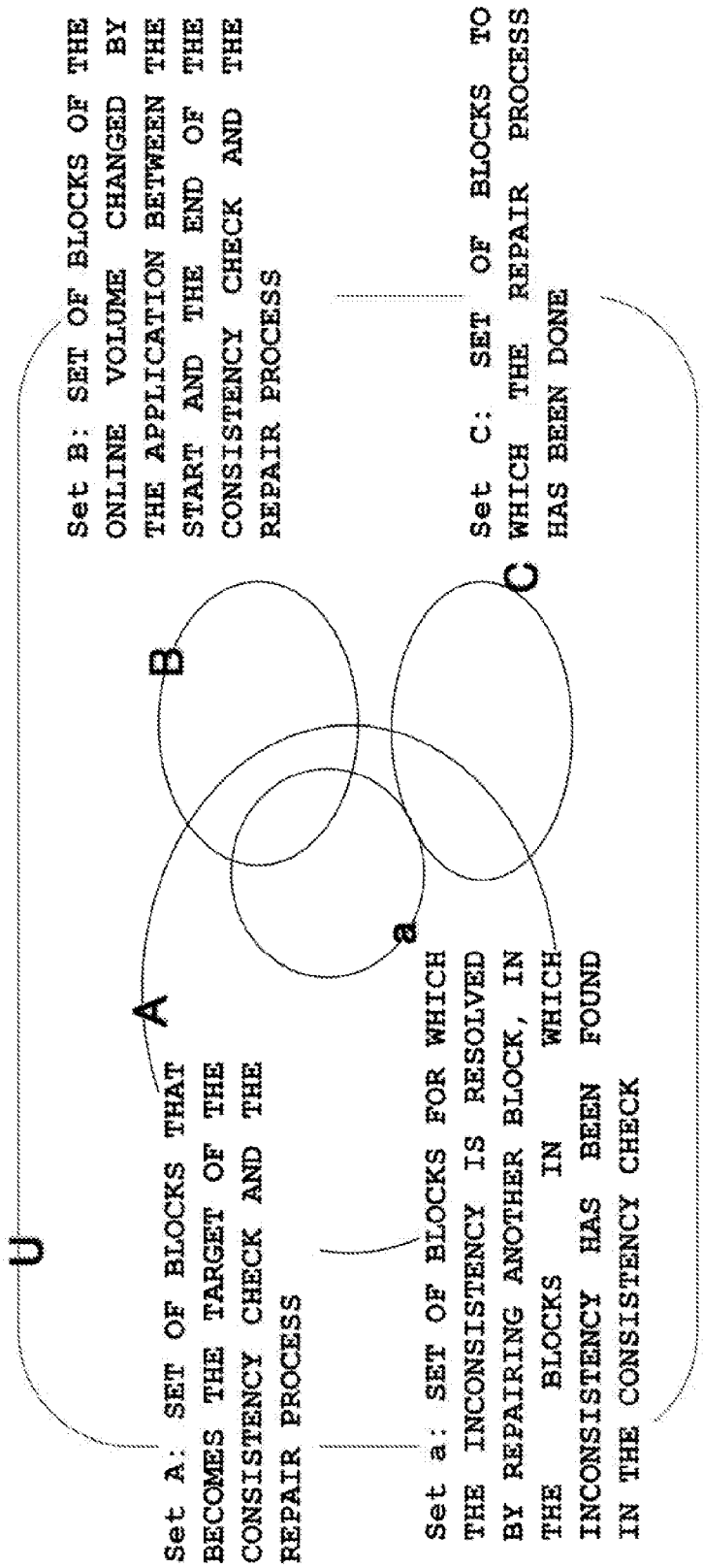
FIG. 8 is a diagram illustrating an example of an address space of an obtaining target volume, in a case in which an address of data of a clone changed by a repair process and an address of data of an online volume changed by an application match does not exist.

Next, the target area of the consistency check and the repair process is explained. FIG. 8 is a diagram explaining an example of the address space of the obtaining target volume, in a case in which there is no match between the address of the data of the clone changed by the repair process and the address of the data of the online volume changed by the application 20.

The set U represents the set of the blocks of the entire online volume.

The set A represents the set of blocks that becomes the target of the consistency check and the repair process. Blocks that have been changed after a prescribed point in time at which the consistency of the file system is guaranteed are the blocks that become the target of the consistency check and the repair process. It can also be said that the set A is a set of blocks of the online volume changed between T(i) and T(i+1) in FIG. 6.

The set B represents the set of blocks of the online volume changed by the application 20 between the start and the end of the consistency check and the repair process.

The set C represents the set of blocks to which the repair process has been done. That is, blocks included in the set Care a set of blocks of the online volume whose AI is stored in the repaired data storage area 65 by the repair process. Meanwhile, the set C may include a block other than the set A. This is because the inconsistency occurred due to the update of the block of the set A may cause inconsistency in another block that has not been updated. For example, a file A constituted by blocks included in the set A and a file B constituted by blocks that are not included in the set A are considered. At this time, it is assumed that the inode number of the file A is updated and overlapped with the inode number of the file B. In this case, it follows that inconsistency occurs in the inode number of the file B that has not been updated. As described above, since the inconsistency occurred due to the update of the block of the set A may cause inconsistency in another block that has not been updated, the set C may include a block other than the set A.

Meanwhile, in the set C, a block to which repair has been done as a result of the execution of the repair process to the block in which inconsistency was found in the consistency check and a new repair was needed, is included.

The set a represents the set of blocks for which the inconsistency is resolved by repairing another block, in the blocks in which inconsistency has been found in the consistency check. That is, blocks included in the set a are blocks for which inconsistency is resolved without any repair process done for themselves.

In the example in FIG. 8, there is no overlapped part between the set B and the set C, and no block that is included in both the set B and the set C exists. This indicates that there is no match between the address of the data of the clone changed by the repair process and the address of the data of the online volume changed by the application 20 during the consistency check and the repair process. In such a case, re-check of consistency is not needed, and by reflecting the data of the address included in the set C on the corresponding address of the online volume, the repair process is terminated.

Figure 9:
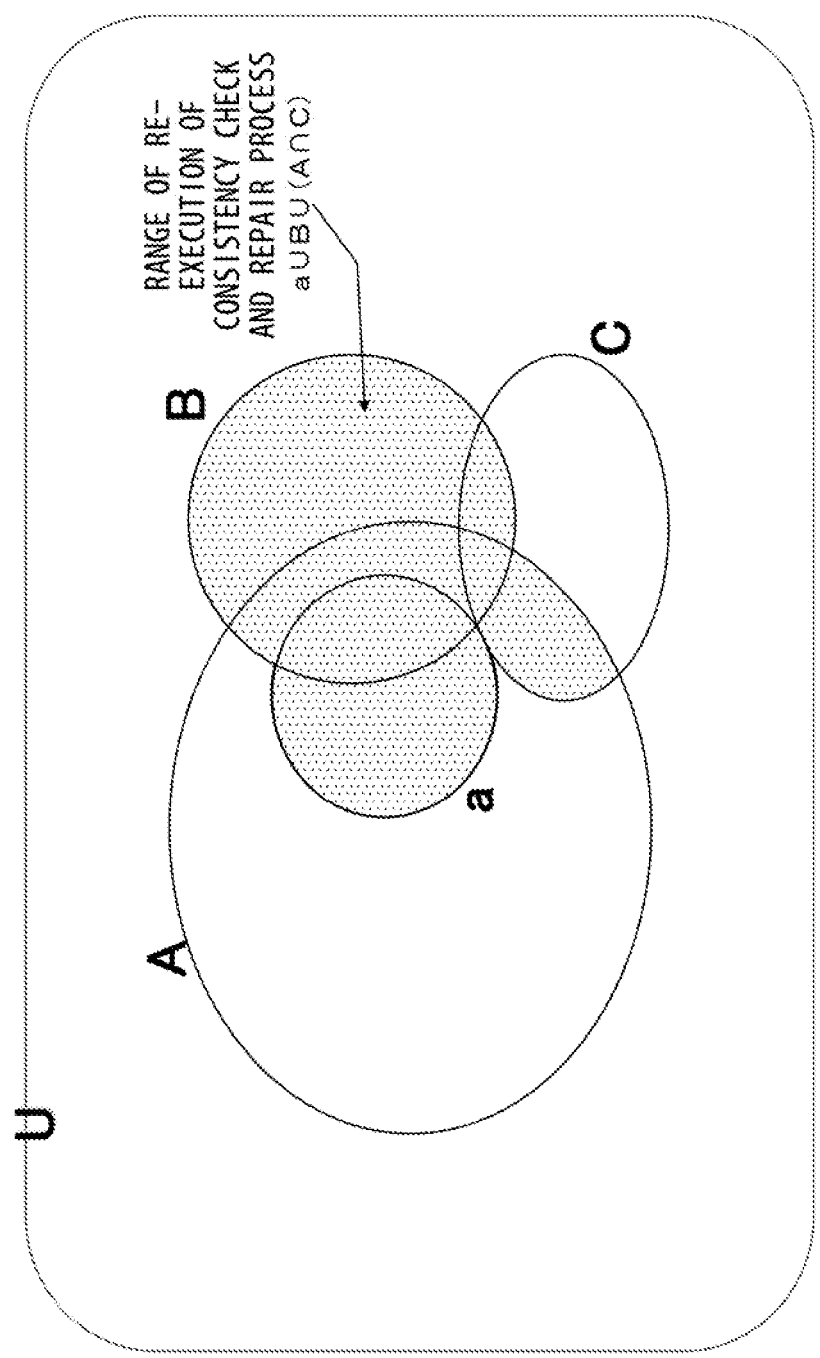
FIG. 9 is a diagram illustrating an example of an address space of an obtaining target volume, in a case in which an address of data of a clone changed by a repair process and an address of data of an online volume changed by an application match exist.

FIG. 9 is a diagram explaining an example of the address space of the obtaining target volume, in a case in which there is a match between the address of data of the clone changed by the repair process and the address of data of the online volume changed during the consistency check and the repair process.

In FIG. 9, sets U, A, B, C, a respectively correspond sets U, A, B, C, a in FIG. 8. Referring to FIG. 9, there is an overlapped part between the set B and the set C (B∩C≠φ) and a block that is included in both the set B and the set C exists. This indicates that there is a match between the address of data of the clone changed by the repair process and the address of data of the online volume changed by the application 20 during the consistency check and the repair process. In such a case, after narrowing down the target range of the check, the consistency check and the repair process is re-executed.

The target area of the re-check of the consistency is, in FIG. 9, the range of the set is a∪B∪(A∩C). Accordingly, the time taken for the re-execution of the consistency check and the repair process may be reduced.

As the re-execution method of the consistency check and the repair process performed after narrowing down the target, it is performed in the same way as the consistency check and the repair process performed initially.

Figure 10:
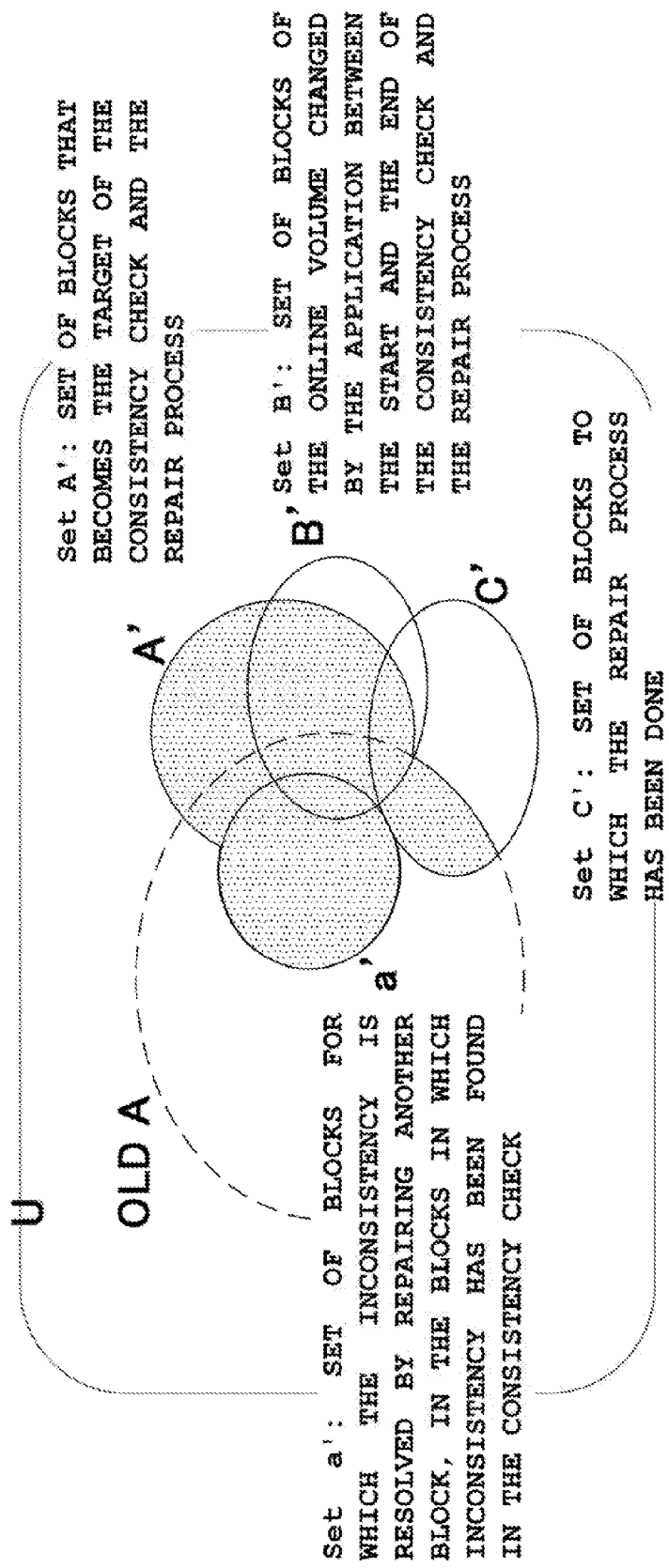
FIG. 10 is a diagram illustrating a target range of a re-execution of a consistency check and a repair process.

FIG. 10 is a diagram illustrating the target area of the re-check of consistency and the repair process. To compare with FIG. 9, sets corresponding to the sets A, B, C, a in FIG. 9 are described as A', B', C', a' in FIG. 10. Then, A'=a∪B∪(A∩C) is established. Then, with A' as the target range, the consistency check and the repair process are re-executed, and whether or not a block included in both B' and C' exists is judged. When it is determined that no block included in both B' and C' exists, the FSCK unit 24 reflects the contents of the repair done to the block of the C' of the clone in the online volume. On the other hand, when it is determined that a block included in both B' and C' exists, the FSCK unit 24 performs the consistency check and the repair process with a'∪B'∪(A'∩C') as the target range. In the cases of FIG. 10, since a block included in both B' and C' exists, the FSCK unit 24 re-executes the consistency check and the repair process with a'∪B'∪(A'∩C') as the target range.

The second re-execution of the consistency check and the repair process with a target range of a'∪B'∪(A'∩C') is performed in the same way as the consistency check and the repair process performed with a∪B∪(A∩C) as the target range.

As described above, even when the consistency check and the repair process is repeated, the target range is narrowed down gradually. Therefore, even when the re-execution of the consistency check and the repair process is repeated, a continued increase of the area to be processed may be avoided. Accordingly, even when the file system expands to a petabyte class, the consistency check and the repair process may be performed online.

Next, actions of the inconsistency check and the repair process of a file system are explained with reference to FIG. 11 and FIG. 12.

Figure 11:
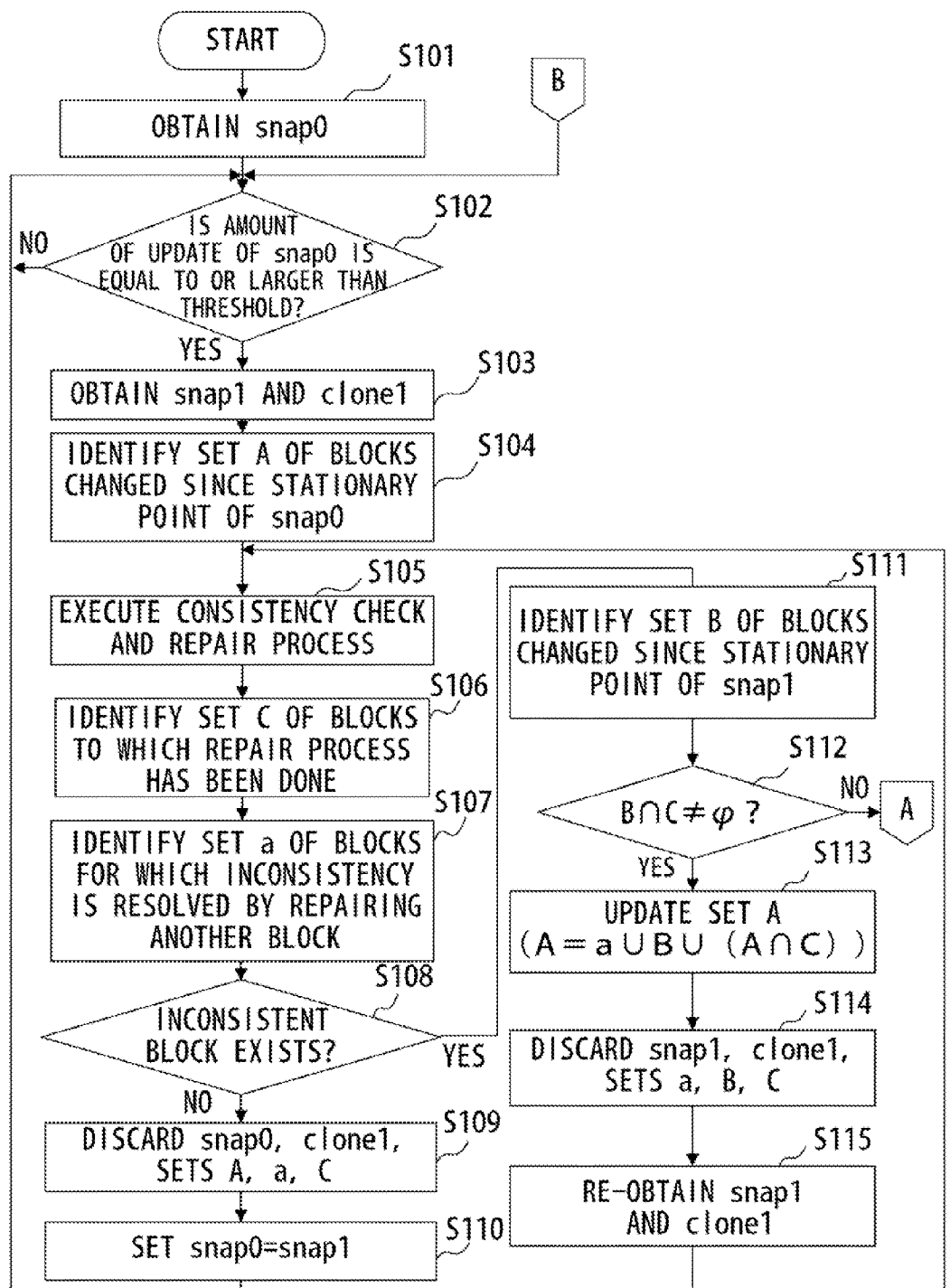
FIG. 11 is the first half of a flowchart illustrating the process details of a consistency check and a repair process of a file system.

FIG. 11 is the first half of a flowchart illustrating the process details of the inconsistency check and the repair process of a file system. FIG. 12 is the second half of a flowchart illustrating the process details of the inconsistency check and the repair process of a file system. Meanwhile, in the explanation in the FIGS. 11, 12, it is assumed that an online volume refers to the online volume to be the consistency check target and the repair target. In addition, it is assumed that sets A, B, C, a in FIGS. 11, 12 respectively correspond to the sets A, B, C, a in FIGS. 8 through 10.

In the flow in FIG. 11, first, the FSCK unit 24 issues an instruction to the history managing unit 25 to start the obtaining of a snapshot snap0 of the online volume at a prescribed point in time at which consistency of the online volume is guaranteed (S101). The start time point of the obtaining is assumed as the stationary point of snap0.

Next, the FSCK unit 24 judges whether or not the amount of an update to the online volume after the stationary point of snap0 is equal to or larger than a prescribed threshold (S102). In this judgment, the FSCK unit 24 first transmits an obtaining request for the amount of an update to the online volume after the stationary point of snap0 to the history managing unit 25. Upon receiving the obtaining request, the history managing unit 25 obtains the amount of an update by referring to the update map of snap0, and sends back the obtained amount of an update to the FSCK unit 24. Specifically, for example, the history managing unit 25 may send back the number of blocks of snap 0 whose bit value in the update map is "1" as the amount of an update, or may send back the value obtained by multiplying the number of blocks snap 0 whose bit value in the update map is "1" by the block size as the amount of an update. Upon receiving the amount of an update to the online volume after the stationary point of snap0 from the history managing unit 25, the FSCK unit 24 judges whether or not the amount of an update is equal to or larger than a prescribed threshold. That is, for example, when the number of blocks of snap0 whose bit value of the update map is "1" is equal to or larger than a prescribed threshold, the FSCK unit 24 determines that the amount of an update is equal to or larger than a prescribed threshold. Meanwhile, when the number of blocks of snap0 whose bit value of the update map is "1" is smaller than a prescribed threshold, the FSCK unit 24 determines that the amount of an update is smaller than a prescribed threshold. Meanwhile, as the prescribed threshold, one stored in a prescribed storage area of the FSCK unit 24 or one stored in the storing unit 23 is used by the FSCK unit 24 by reading it onto a prescribed storage area.

When it is determined that the amount of an update after the stationary point of snap0 is smaller than a prescribed threshold (No in S102), S102 is repeated again. On the other hand, when it is determined that the amount of an update after the stationary point of snap0 is equal to or larger than a prescribed threshold (Yes in S102), the FSCK unit 24 issues an instruction to the history managing unit 25 to start the obtaining of a snapshot snap1, and a clone clone1 based on snap1 (S103). The start time point of the obtaining is assumed as the stationary point of snap1 and clone1.

Next, the FSCK unit 24 identifies the set A of blocks of the online volume updated after the stationary point of snap0 (S104). Specifically, the FSCK unit 24 transmits an obtaining request for the set A of blocks of the online volume updated after the stationary point of snap0 to the history managing unit 25. Upon receiving the obtaining request, the history managing unit 25 obtains the set A of blocks by referring to the update map of snap0, and sends back the obtained set A of blocks to the FSCK unit 24. That is, the history managing unit 25 sends back a set of block numbers (or LBAs) of blocks of snap0 whose bit value of the update map is "1" to the FSCK unit 24. The set A of blocks identified here is a set of blocks that become the target of the consistency check and the repair process.

Next, the FSCK unit 24 performs the consistency check and the repair process in the range of the set A on clone1, based on the set A identified in S104 and the data of the block included in the set before and after a change (S105). Here, the data of the block included in the set before and after a change is, in other words, the difference between the stationary point of snap0 and the stationary point of snap1 in the online volume. The FSCK unit 24 identifies the set C of blocks to which the repair process has been done, from the result of the consistency check and the repair process (S106). In addition, the FSCK unit 24 identifies the set a of blocks for which inconsistency is resolved by repairing another block, in the blocks determined as the repair target, as a result of the consistency check (S107).

Next, the FSCK unit 24 judges whether or not a block having an occurrence of inconsistency exists, as a result of the consistency check in S105 (S108). That is, the FSCK unit 24 judges whether or not a block included in the set C and set a exists.

When it is determined that no block having an occurrence of inconsistency exists (No in S108), the FSCK unit 24 discards snap0, clone1, and sets A, a, C (S109). That is, the FSCK unit 24 sends a discarding request for snap0 and clone1 to the history managing unit 25, and also deletes the sets A, a, C. Then, the FSCK unit 24 newly sets snap1 and snap0 (S110). Then, the process shifts to S102.

In S108, when it is determined that a block having an occurrence of inconsistency exists (Yes in S108), the FSCK unit 24 identifies the set B of blocks of online volume updated after the stationary point of snap 1 (S111). Specifically, the FSCK unit 24 transmits an obtaining request for the set B of blocks of the online volume updated after the stationary point of snap1 to the history managing unit 25. Upon receiving the obtaining request, the history managing unit 25 obtains the set B of blocks by referring to the update map of snap1, and sends back the obtained set B of blocks to the FSCK unit 24. That is, the history managing unit 25 sends back a set of block numbers (or LBAs) of blocks of snap1 whose bit value of the update map is "1" to the FSCK unit 24.

Next, the FSCK unit 24 judges whether or not a block included in both the set C identified in S106 and the set B identified in S111 (whether or not (B∩C≠φ) (S112). That is, the FSCK unit 24 judges whether or not there is a match between the address of a block of the set C and the address of a block of the set B. When it is determined that there is a match between the address of a block of the set C and the address of a block of the set B (B∩C≠φ) (Yes in S112), the FSCK unit 24 updates the set A to a∪B∪(A∩C) so as to perform the consistency check and the repair process to a narrowed target range (S113). Then, the FSCK unit 24 discards snap1, clone1, the sets a, B, C (S114). That is, the FSCK unit 24 transmits a discarding request for snap1, and clone1 to the history managing unit 25, and discards the sets a, B, C. Next, the FSCK unit 24 issues an instruction to the history managing unit 25 so as to re-obtain snap1, and clone1 (S115). Meanwhile, the point in time at which the re-obtaining starts becomes the new stationary point of snap1, and clone1. Then, the process shifts to S105.

Figure 12:
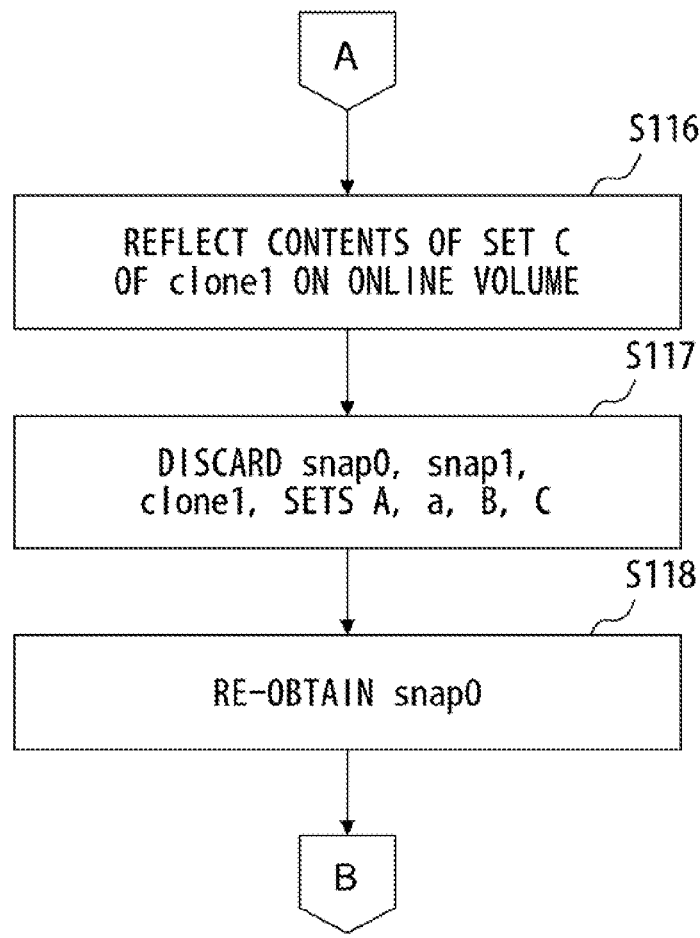
FIG. 12 is the second half of a flowchart illustrating the process details of a consistency check and a repair process of a file system.

On the other hand, in FIG. 12, when it is determined that no block included in both the set C and the set B exists (B∩C=ϕ), (No in S112), the process shifts to S116 (see FIG. 12).

In S112, when it is determined that no block included in both the set C and the set B exists, in FIG. 12, the FSCK unit 24 issues an instruction to the history managing unit 25 to reflect the data of the block included in the set C after a change in the online volume (S116). Upon receiving the instruction for reflecting, the history managing unit 25 first inputs the address of the block included in the set C as a key into the storage map 61 of clone1, and obtains the address of the repaired data storage area 65 in which the data (AI) after a change is stored. Next, the history managing unit 25 refers to the obtained address of the repaired data storage area 65, and obtains the data (AI) after a change. Then, the history managing unit 25 changes the block included in the set C of the online volume to the data (AI) after a change.

Next, the FSCK unit 24 discards snap0, snap1, clone1, the sets A, a, B, C (S117). That is, the FSCK unit 24 issues a discarding request for snap0, snap1, clone1, the sets A, a, B, C to the history managing unit 25, and deletes the sets A, a, B, C. Then, the FSCK unit 24 issues an instruction to the history managing unit 25 to re-obtain snap0 (S118), and makes the process shift to S102 (see FIG. 11).

Next, the configuration of the information processing apparatus 10 is explained. FIG. 13 illustrates an example of the hardware configuration of the information processing apparatus.

The information processing apparatus 10 includes a CPU 401, a memory 402, a storage apparatus 403, a reading apparatus 404, and a communication interface 405. The CPU 401, the memory 402, the storage apparatus 403, the reading apparatus 404, and the communication interface 405 are connected through a bus.

The CPU 401 provides a part or the entirety of the functions of the application 20, FSD 21 and the volume managing unit 22 by executing a program describing the procedure of the flowchart described above using a memory 402.

The memory 402 is a semiconductor memory for example, and is configured including a RAM area and a ROM area. The storage apparatus 403 is a hard disk for example, and stores the program regarding the consistency check and the repair process of the embodiment. Meanwhile, the storage apparatus 403 may be a semiconductor memory such as a flash memory and the like. In addition, the storage apparatus 403 may also be an external recording apparatus. The memory 402 or the storage apparatus 403 stores data to realize the snapshot, and the clone. That is, the memory 402 or the storage apparatus 403 stores one or all of the update maps of the snapshot, the saving map of the snapshot, the update map of the clone, and the storage map of the clone, for example. The memory 402 or the storage apparatus 403 provides a part or the entirety of the functions of the storing unit 23.

The reading apparatus 404 accesses a detachable recording medium 450 according to the instruction of the CPU 401. The detachable recording medium 450 is realized by, for example, a semiconductor device (a USB memory and the like), a medium to/from which information is input/output by a magnetic effect (a magnetic disk and the like), a medium to/from which information is input/output by an optical effect (a CD-ROM, a DVD and the like). Meanwhile, the reading apparatus 404 does not have to be included in the information processing apparatus 10.

The communication interface 405 connects to another information processing apparatus, and performs data transmission/reception between the application 20 and another information processing apparatus 10. Meanwhile, the communication interface 405 does not have to be included in the information processing apparatus 10.

The communication program of the embodiment is provided to the information processing apparatus in the following formats, for example.
(1) Installed in the storage apparatus 403 in advance.
(2) Provided by the detachable recording medium 450.
(3) Provided by a program server (not illustrated in the drawing) through the communication interface 405.

Figure 14:
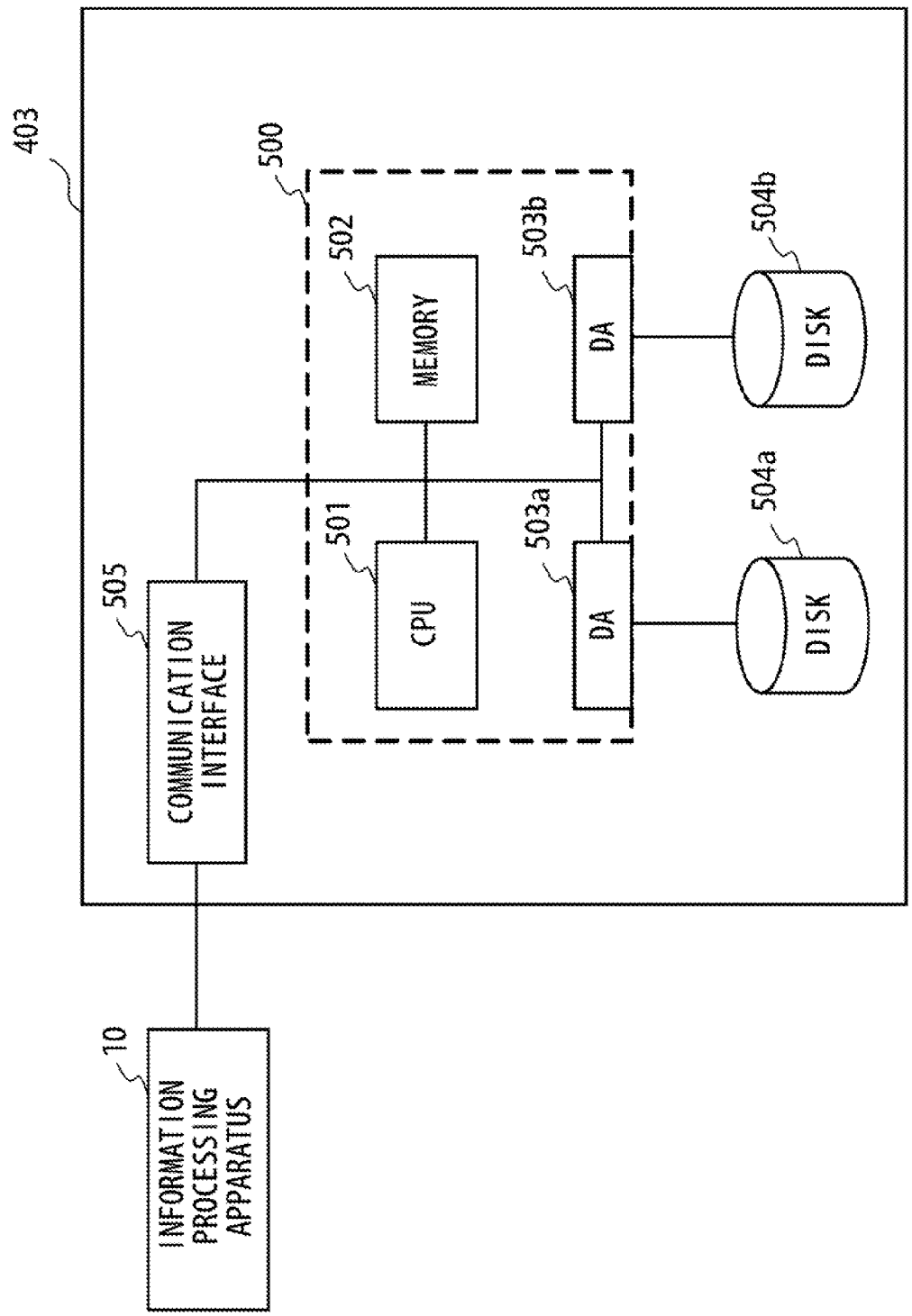
FIG. 14 is an example of a configuration in which a storage apparatus includes a CM and is connected to an information processing apparatus through a communication interface.

Another example of the configuration of the information processing apparatus 10 is explained. FIG. 14 is an example of the configuration in which, in the hardware configuration of the information processing apparatus 10, the storage apparatus 403 includes a CM (Controller Module), and is connected to the information processing apparatus 10 through the communication interface.

The storage apparatus 403 includes a CM 500, disks 504a, 504b, and a communication interface 505.

The CM 500 includes a CPU 501, a memory 502, DAs (Device Adapters) 503a, 503b. The CPU 501 controls the actions of the CM 500. The memory 502 stores various information used for the control of the CM 500. The CPU 501 provides a part or the entirety of the functions of the volume managing unit. Meanwhile, when the CPU 501 provides the entirety of the functions of the volume managing unit 22, the configuration may be made so that the CPU 401 of the information processing apparatus 10 does not provide the functions of the volume managing unit 22. The memory 502 is a semiconductor memory for example, and includes a RAM area and a ROM area. The memory 502 stores the program on which processes that the CPU 501 is made to execute are described. The memory 502 may store one or all of the update maps of the snapshot, the saving map of the snapshot, the update map of the clone, and the storage map of the clone. The DAs 503a, 503b are connected to the disks 504a, 504b, respectively, and perform data input/output to/from the connected disk.

The disks 504a, 504b are, for example, a hard disk. The disks 504a, 504b may be a semiconductor memory such as a flash memory. In addition, the disks 504a, 504b provides a part or the entirety of the functions of the storing unit 23.

The communication interface 505 connects to the communication interface 405 of the information processing apparatus 10, and performs data transmission/reception through a network according to the instruction of the CPU 501.

Meanwhile, the present embodiment is not limited to the embodiment described above, and may take various configurations or embodiments without departing from the scope of the present embodiment.

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a storing unit that includes a first storage area managed by a file system and a second storage area to store data; and
an processor that executes a procedure including:
performing a repair process including detecting whether there is any abnormality in data read out from the first storage area, repairing data in which abnormality is detected as a result of the detection, and storing the repaired data in the second storage area;
performing a determination process of determining whether one or more addresses of changed data, which is data changed in the repair process most recently performed in the first storage area, include an address that is identical with one or more addresses of a read-out source of abnormal data, which is data detected in the repair process most recently performed;
performing, when identical addresses are determined to be present in the determination process most recently performed, the repair process and the determination process on data read out from an area indicated by one or more addresses of the changed data in the first storage area and one or more addresses of the read-out source of the abnormal data;
writing, when identical addresses are determined not to be present in the determination process most recently performed, the data repaired in the repair process most recently performed into the address of the read-out source of the abnormal data in the first storage area.

2. The information processing apparatus according to claim 1, the procedure further comprising
identifying, in the first storage area, an address in which data updated within a prescribed period is stored,
wherein
the detecting detects whether there is any abnormality in data read out from the address identified in the first storage area.

3. A non-transitory computer-readable recording medium having stored therein a program for causing a computer to execute a process, the process comprising:
performing a repair process including detecting whether there is any abnormality in data read out from the first storage area, repairing data in which abnormality is detected as a result of the detection, and storing the repaired data in the second storage area;
performing a determination process of determining whether one or more addresses of changed data, which is data changed in the repair process most recently performed in the first storage area, include an address that is identical with one or more addresses of a read-out source of abnormal data, which is data detected in the repair process most recently performed;
performing, when identical addresses are determined to be present in the determination process most recently performed, the repair process and the determination process on data read out from an area indicated by one or more addresses of the changed data in the first storage area and one or more addresses of the read-out source of the abnormal data;
writing, when identical addresses are determined not to be present in the determination process most recently performed, the data repaired in the repair process most recently performed into the address of the read-out source of the abnormal data in the first storage area.

4. The non-transitory computer-readable recording medium according to claim 3, the process further comprising
identifying, in the first storage area, an address in which data updated within a prescribed period is stored,
wherein
the detecting detects whether there is any abnormality in data read out from the address identified in the first storage area.

5. A data repairing method realized by having a computer execute a process, the process comprising:
performing a repair process including detecting whether there is any abnormality in data read out from the first storage area, repairing data in which abnormality is detected as a result of the detection, and storing the repaired data in the second storage area;
performing a determination process of determining whether one or more addresses of changed data, which is data changed in the repair process most recently performed in the first storage area, include an address that is identical with one or more addresses of a read-out source of abnormal data, which is data detected in the repair process most recently performed;
performing, when identical addresses are determined to be present in the determination process most recently performed, the repair process and the determination process on data read out from an area indicated by one or more addresses of the changed data in the first storage area and one or more addresses of the read-out source of the abnormal data;
writing, when identical addresses are determined not to be present in the determination process most recently performed, the data repaired in the repair process most recently performed into the address of the read-out source of the abnormal data in the first storage area.

6. The data repairing method according to claim 5, further comprising
identifying, in the first storage area, an address in which data updated within a prescribed period is stored,
wherein
the detecting detects whether there is any abnormality in data read out from the address identified in the first storage area.

* * * * *